US010474681B1

(12) United States Patent
Kenthapadi et al.

(10) Patent No.: US 10,474,681 B1
(45) Date of Patent: Nov. 12, 2019

(54) FILTERING MAPPED DATASETS

(71) Applicant: Microsoft Technology Licensing, LLC, Redmond, WA (US)

(72) Inventors: Krishnaram Kenthapadi, Sunnyvale, CA (US); Stuart MacDonald Ambler, Longmont, CO (US); Parul Jain, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

(21) Appl. No.: 15/715,332

(22) Filed: Sep. 26, 2017

(51) Int. Cl.
*G06F 16/00* (2019.01)
*G06F 16/2457* (2019.01)
*G06F 21/62* (2013.01)
*G06F 16/248* (2019.01)

(52) U.S. Cl.
CPC ...... *G06F 16/24575* (2019.01); *G06F 16/248* (2019.01); *G06F 21/6245* (2013.01)

(58) Field of Classification Search
CPC ............... G06F 21/6245; G06F 21/604; G06F 21/6218; G06F 16/248; G06F 16/254; G06F 17/18; G06F 21/6227; G06F 16/00
See application file for complete search history.

(56) References Cited

U.S. PATENT DOCUMENTS

| | | | | |
|---|---|---|---|---|
| 10,268,660 | B1* | 4/2019 | Arazi | A63F 13/50 |
| 2014/0154247 | A1* | 6/2014 | Behrens | C12Q 1/6883 |
| | | | | 424/134.1 |
| 2016/0260044 | A1* | 9/2016 | Sabet | G06Q 10/06398 |
| 2017/0235871 | A1* | 8/2017 | Eden | G16H 50/50 |
| | | | | 703/2 |
| 2018/0089196 | A1* | 3/2018 | Kenthapadi | G06F 21/6245 |
| 2018/0322463 | A1* | 11/2018 | Pattabiraman | G06Q 50/01 |

* cited by examiner

*Primary Examiner* — Merilyn P Nguyen
(74) *Attorney, Agent, or Firm* — Schwegman Lundberg & Woessner, P.A.

(57) ABSTRACT

In an example, a method includes generating a targeted communication to respective computing devices of one or more members of an online social networking service, electronically collecting the responses to the targeted communication, mapping the responses to a cohort by updating a record in a database of members, the record identifying the cohort for the respective member, filtering information corresponding to a cohort to provide filtered cohort, and suppressing displaying of information corresponding to the cohort in response to the filtered information for the cohort indicating one or more of the biases being above a bias threshold value.

20 Claims, 27 Drawing Sheets

FILTERING MAPPED DATASETS

TECHNICAL FIELD

The present disclosure generally relates to computer technology for solving technical challenges in filtering data for external organization data that is mapped to a private dataset in a computer system. More specifically, the present disclosure relates to determining bias in the mapped data and displaying the mapped organization data according to the bias computations.

BACKGROUND

In various types of computer systems, there may be a need to collect, maintain, and utilize confidential data. In some instances, users may be reluctant to share this confidential information over privacy concerns. These concerns extend not only to pure security concerns, such as concerns over whether third parties such as hackers may gain access to the confidential data, but also to how the computer system itself may utilize the confidential data. With certain types of data, users providing the data may be somewhat comfortable with uses of the data that maintain anonymity, such as the confidential data merely being used to provide broad statistical analysis to other users.

One example of such confidential data is salary/compensation information. It may be desirable for a service such as a social networking service to entice its members to provide information about their salary or other work-related compensation in order to provide members with insights as to various metrics regarding salary/compensation, such as an average salary for a particular job type in a particular city. There are technical challenges encountered, however, in ensuring that such confidential information remains confidential and is only used for specific purposes, and it can be difficult to convince members to provide such confidential information due to their concerns that these technical challenges may not be met. Additionally, it can be difficult to ensure accuracy and reliability of the confidential data.

In other examples, public data is available for integration into the online social networking service to accentuate information about the members. However, it is not readily known which entities represented in the public data are members of the online social networking service or which entities in the public data map to members of the online social networking service. Furthermore, on occasion, members provide inaccurate information for a variety of reasons and introduce bias into the data set.

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an architecture is provided that gathers confidential information from members in cohorts, maps external data to the cohorts, and calculates various biases of the data associated with the cohorts. In response to one of the biases of a cohort being above a tolerable level (e.g., a numerical value), the architecture may be configured to prevent displaying data associated with the cohort. In this way, the architecture ensure that data mapped to a specific cohort is not displayed if there is a sufficient level of bias. The architecture also tracks the submission of the confidential information, and maintains and utilizes the confidential information in a secure manner while ensuring that the confidential information is accurate and reliable.

In certain specific embodiments, the architecture computes an aggregate relative deviation in median base salary, aggregate relative deviation in the range for the base salary, relative deviation in the range for the base salary, and aggregate relative deviation in the range for the base salary. The architecture compares the set of members of an online social networking service with ground truth data that is mapped to certain cohorts and assigns a bias metric for the cohort according to the results of the bias calculations.

Figure 1:
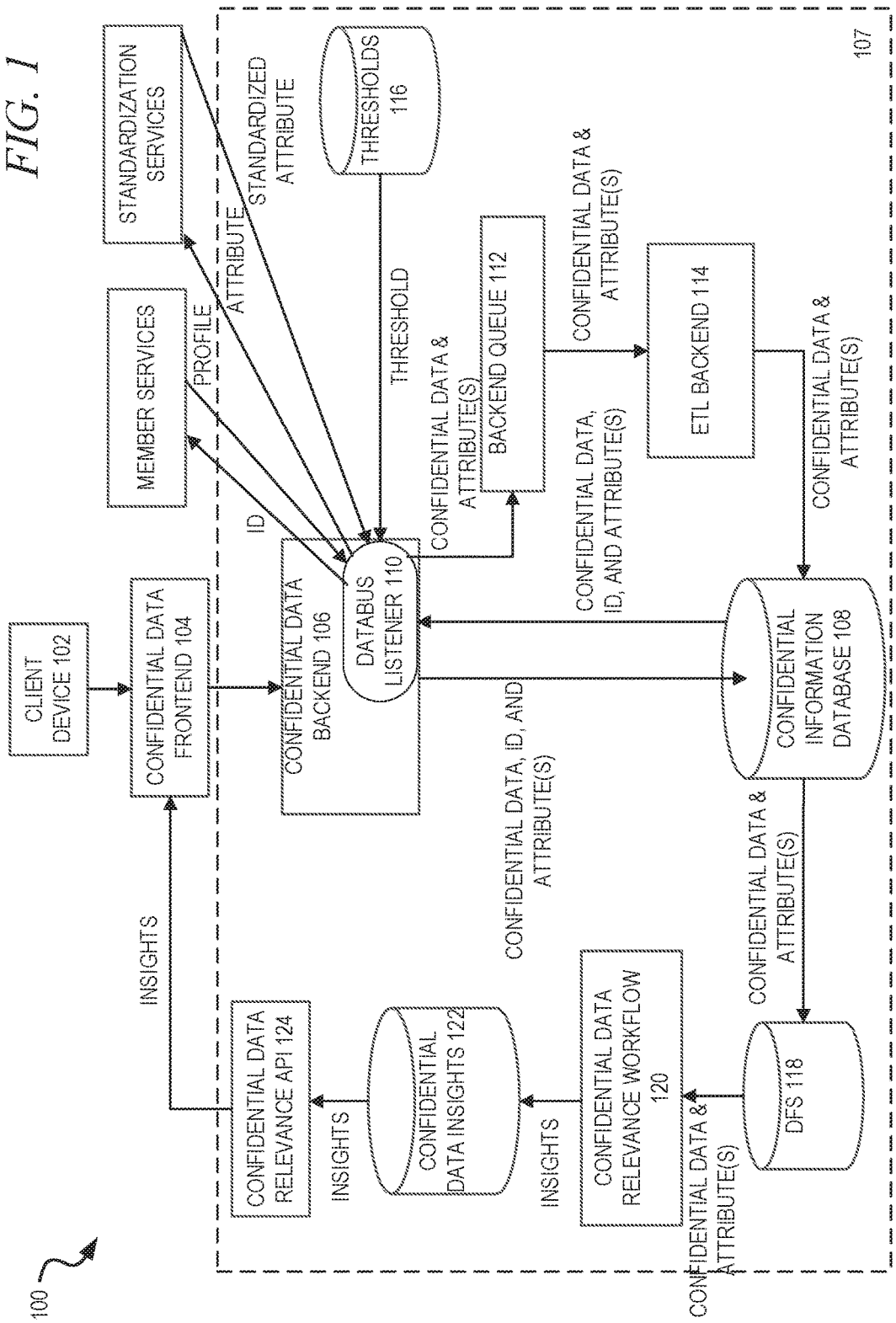
FIG. 1 is a block diagram illustrating a confidential data collection, tracking, and usage system, in accordance with an example embodiment.

FIG. 1 is a block diagram illustrating a confidential data collection, tracking, and usage system 100, in accordance with an example embodiment. A client device 102 may utilize a confidential data frontend 104 to submit confidential information to a confidential data backend 106. In some example embodiments, the confidential data backend 106 is located on a server-side or cloud platform 107 while the confidential data frontend 104 is directly connected to or embedded in the client device 102. However, in some example embodiments, the confidential data frontend 104 is also located on the server-side or cloud platform 107.

There may be various different potential implementations of the confidential data frontend 104, depending upon the type and configuration of the client device 102. In an example embodiment, the confidential data frontend 104 may be a web page that is served to a web browser operating on the client device 102. The web page may include various scripts, such as Javascript code, in addition to Hypertext Markup Language (HTML) and Cascading Style Sheets (CSS) code designed to perform various tasks that will be described in more detail below. The web page may be served in response to the user selecting a link in a previous communication or web page. For example, the link may be displayed in an email communication to the user, or as part of a feed section of the user's social networking service member page. This allows the entity operating the confidential data collection, tracking, and usage system 100 to selectively target users to request that they submit confidential information. For example, the entity may determine that there is a need to obtain more salary information for users from Kansas and then may send out communications to, or cause the social networking service to alter feeds of, users in a manner that allows the users to select the link to launch the confidential data frontend 104.

In another example embodiment, the confidential data frontend 104 may be built into an application installed on the client device 102, such as a standalone application running on a smartphone. Again this confidential data frontend 104 is designed to perform various tasks that will be described in more detail below.

One task that the confidential data frontend 104 may be designed to perform is the gathering of confidential data from a user of the client device 102. Another task that the confidential data frontend 104 may be designed to perform is to display insights from confidential data contributed by other users. In order to incentivize users to provide certain types of confidential data, in an example embodiment, insights from the confidential data contributed by other users are provided in response to the user contributing his or her own confidential data. As will be described in more detail, a mechanism to ensure that the contribution of confidential data is tracked is provided.

Once the confidential data is received from the user, the confidential data frontend 104 may transmit the confidential data along with an identification of the user (such as a member identification reflecting the user's account with a social networking service) to the confidential data backend 106. In an example embodiment, this may be performed via, for example, a REST Application Program Interface (API).

The confidential data, along with the identification of the user, may be stored in a submission table by the confidential data backend 106 in a confidential information database 108. In some example embodiments, this submission table may be encrypted in order to ensure security of the information in the submission table. Furthermore, in some example embodiments, the confidential data stored in the submission table may be encrypted using a different key than the identifying information in the submission table. This encryption will be described in more detail below.

In another example embodiment, a random transaction number is generated for each confidential data submission. This random transaction number is stored with the identifying information in one table, and then stored with the confidential data in another table, with each table encrypted separately using a different key. In either this example embodiment or the previous example embodiment, encrypting the identifying information separately from the confidential data (either in one table or in separate tables) provides added security against the possibility that a malicious user could gain access to one or the other. In other words, even if a malicious user gained access to the identifying information by, for example, hacking the encryption used to encrypt the identifying information that would not allow the malicious user to gain access to the confidential data corresponding to the identifying information, and vice versa. In an example embodiment, the encryption mechanism used is one that is non-deterministic, such that the same information encrypted twice would produce different results in each encryption. In another example embodiment, the transaction number itself is also encrypted, thereby preventing even the act of joining separate tables containing the identifying information and the confidential data.

In an example embodiment, a submission table may also be able to track when submissions were made by users. As such, the submission table may include additional columns such as, for example, a submission identification, an identification of the user who made the submission, an encryption key for the submission, and timestamp information about when the submission was made. The submission table may then be utilized by the confidential data backend 106 to determine, for example, when to share insights from submissions from other users to a particular user. If, for example, the user has previously submitted confidential data and has done so recently (e.g., within the last year), then the confidential data backend 106 may indicate to the confidential data frontend 104 that it should share insights from confidential data from other users with this particular user.

There may be other methods than those described above for determining eligibility of a user for receiving insights from submissions from other users. For example, a predicate expressed in terms of one or more attributes may need to be satisfied in order to receive the insights, such as particular demographic or profile-based attributes. These attributes can include any such attribute, from location to title, to level of skill, to social networking service activities or status (e.g., about to transition from being an active member to an inactive member), to transactional attributes (e.g., purchased a premium subscription).

Additionally, any combination of the above factors can be used to determine whether the user is eligible for receiving insights from submissions from other users.

Furthermore, the submission table may also include one or more attributes of the user that made the submission. These attributes may be attributes that can be useful in determining a slice to which the user belongs. Slices will be described in more detail below, but generally involve a segment of users sharing common attributes, such as titles, locations, educational levels, and the like. It should be noted that it is not necessary for these attributes to be stored in the submission table. Since an identification of the user is available in the submission table, it may be possible to retrieve the attributes for the user on an as-needed basis, such as by querying a social networking service with the user identification when needed.

A databus listener 110 detects when new confidential data is added to the confidential information database 108 and triggers a workflow to handle the new confidential data. First, the databus listener 110 queries a thresholds data store 116 to determine if one or more thresholds for anonymization have been met. Specifically, until a certain number of data points for confidential data have been met, the confidential data collection, tracking, and usage system 100 will not act upon any particular confidential data data point. As will be described in more detail later, these thresholds may be created on a per-slice basis. Each slice may define a segment of users about which insights may be gathered based on data points from confidential data submitted by users in the slice. For example, one slice may be users with the title "software engineer" located in the "San Francisco Bay Area." If, for example, the confidential data is compensation information, then it may be determined that in order to gain useful insights into the compensation information for a particular title in a particular region, at least ten data points (e.g., compensation information of ten different users) are needed. In this case, the threshold for "software engineer" located in "San Francisco Bay Area" may be set at ten. The databus listener 110, therefore, is designed to retrieve the confidential data added to the confidential information database 108, retrieve the threshold for the slice corresponding to attributes of the user (as stored, for example, in the submission table in the confidential information database 108 or retrieved at runtime from a social networking service), determine if the new data point(s) cause the threshold for the corresponding slice to be exceeded, and, if so, or if the threshold had already been exceeded, insert the data in a backend queue 112 for extract, transform, and load (ETL) functions.

In an example embodiment, the thresholds data store 116 contains not just the thresholds themselves but also a running count of how many data points have been received for each slice. In other words, the thresholds data store 116 indicates how close the slice is to having enough data points with which to provide insights. The databus listener 110 may reference these counts when making its determination that a newly submitted data point causes a threshold to be exceeded. Running counts of data points received for each slice are updated in the thresholds data store 116 by the confidential data backend 106.

Since the databus listener 110 only transfers data points for a particular slice to the backend queue 112 once the threshold for that slice has been exceeded, the confidential data data points corresponding to that slice may need to be retrieved from the confidential information database 108 once the threshold is determined to be exceeded. For example, if, as above, the threshold for a particular slice is ten data points, the first nine data points received for that slice may simply be left in the confidential information database 108 and not sent to the backend queue 112. Then, when the tenth data point for the slice is stored in the confidential information database 108, the databus listener 110 may determine that the threshold has been exceeded and retrieve all ten data points for the slice from the confidential information database 108 and send them to the backend queue 112 for processing.

It should be noted that the information obtained by the databus listener 110 from the confidential information database 108 and placed in the backend queue 112 is anonymized. In an example embodiment, no identification of the users who submitted the confidential data is provided to the backend queue 112. Indeed, in some example embodiments, the information provided to the backend queue 112 may simply be the confidential data itself and any information needed in order to properly group the confidential data in one or more slices. For example, if slices are designed to group user confidential data based only on user title, location, and years of experience, other attributes for the user that might have been stored in the confidential information database 108, such as schools attended, may not be transferred to the backend queue 112 when the confidential data tied to those attributes is transferred to the backend queue 112. This further helps to anonymize the data, as it makes it more difficult for people to be able to deduce the identity of a user based on his or her attributes.

It should also be noted that any one piece of confidential data may correspond to multiple different slices, and thus the databus listener 110 may, in some example embodiments, provide the same confidential data to the backend queue 112 multiple times. This can occur at different times as well, because each of the slices may have its own threshold that may be transgressed at different times based on different counts. Thus, for example, compensation data for a user in the "San Francisco Bay Area" with a job title of "software developer" and a school attended as "Stanford University" may be appropriately assigned to one slice of software developers in the San Francisco Bay Area, a slice of Stanford University alums, and a slice of software developers in the United States. All slices may have their own thresholds and counts from confidential data from other users, who may or may not have complete overlap with these three slices.

An ETL backend 114 acts to extract, transform, and load the confidential data to anonymize and group it and place it back in the confidential information database 108 in a different location from that where it was stored in non-anonymized form. It should be noted that in some example embodiments, the anonymization described above with respect to the databus listener 110 may actually be performed by the ETL backend 114. For example, the databus listener 110 may send non-anonymized confidential data along with all attributes to the backend queue 112, and it may be the ETL backend 114 that reviews this data and discards certain elements of it to anonymize it.

In an example embodiment, the confidential information is stored in encrypted format in the confidential information database 108 when the databus listener 110 sends it to the backend queue 112. As such, one function of the ETL backend 114 is to decrypt the confidential information. Encryption and decryption of the confidential data will be discussed in more detail below.

The ETL backend 114 writes the anonymized confidential data and slice information into an ETL table corresponding to the slice in the confidential information database 108. As described earlier, this ETL table may be stored in a different location than that in which the confidential data was stored initially, such as the submission table described earlier.

At a later time, and perhaps using a batch or other periodic process, the information from the ETL table may be loaded in a distributed file system (DFS) 118. A confidential data relevance workflow 120 may then extract relevant information from the DFS 118 and provide one or more insights into the relevant information in a confidential data insights data store 122. A confidential data relevance API 124 may then be utilized to provide insights from the confidential data insights data store 122 to the confidential data frontend 104, which can then display them to a user. As described earlier, these insights may be provided only on a "give-to-get" basis, namely that only users who provide confidential information (and/or have provided it recently) can view insights.

Figure 2A:
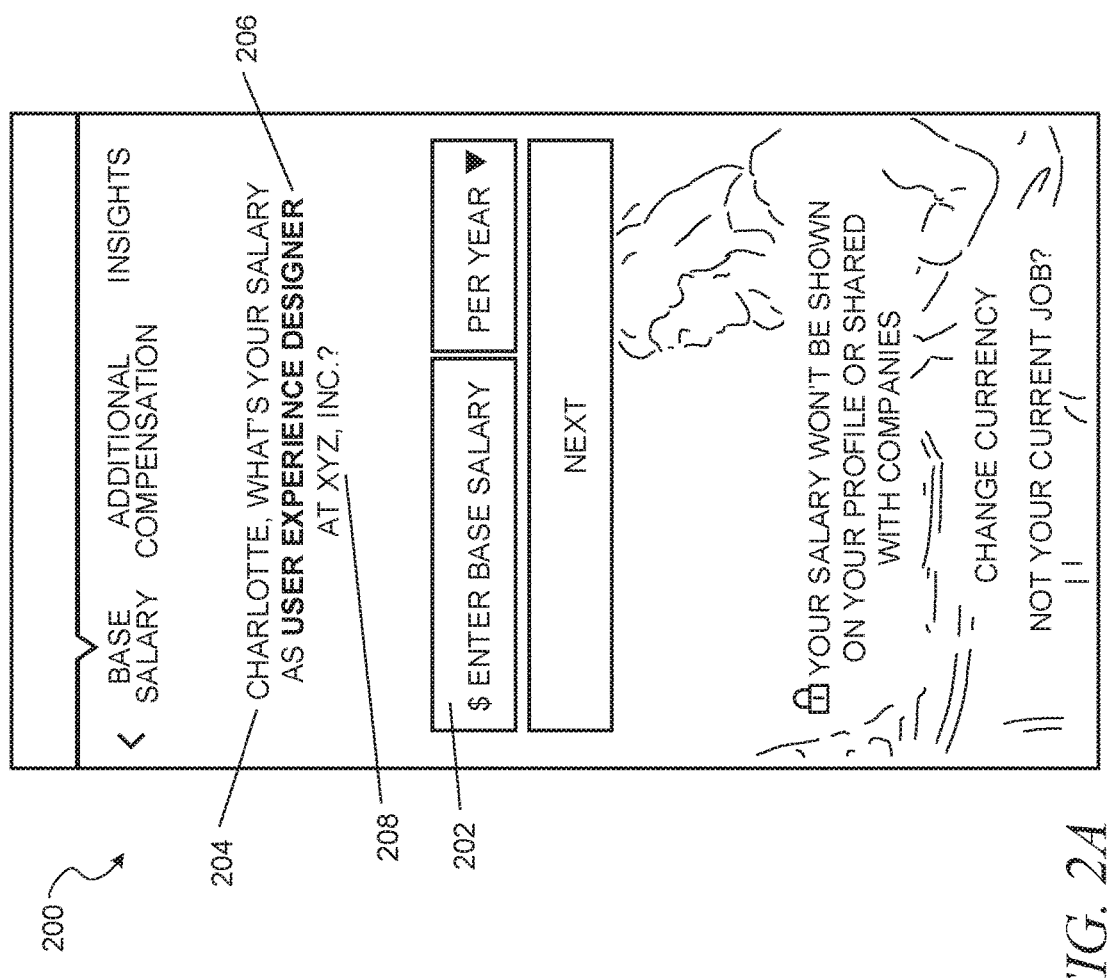
FIGS. 2A-2C are screen captures illustrating an example of a user interface provided by a confidential data frontend, in accordance with an example embodiment.
Figure 2B:
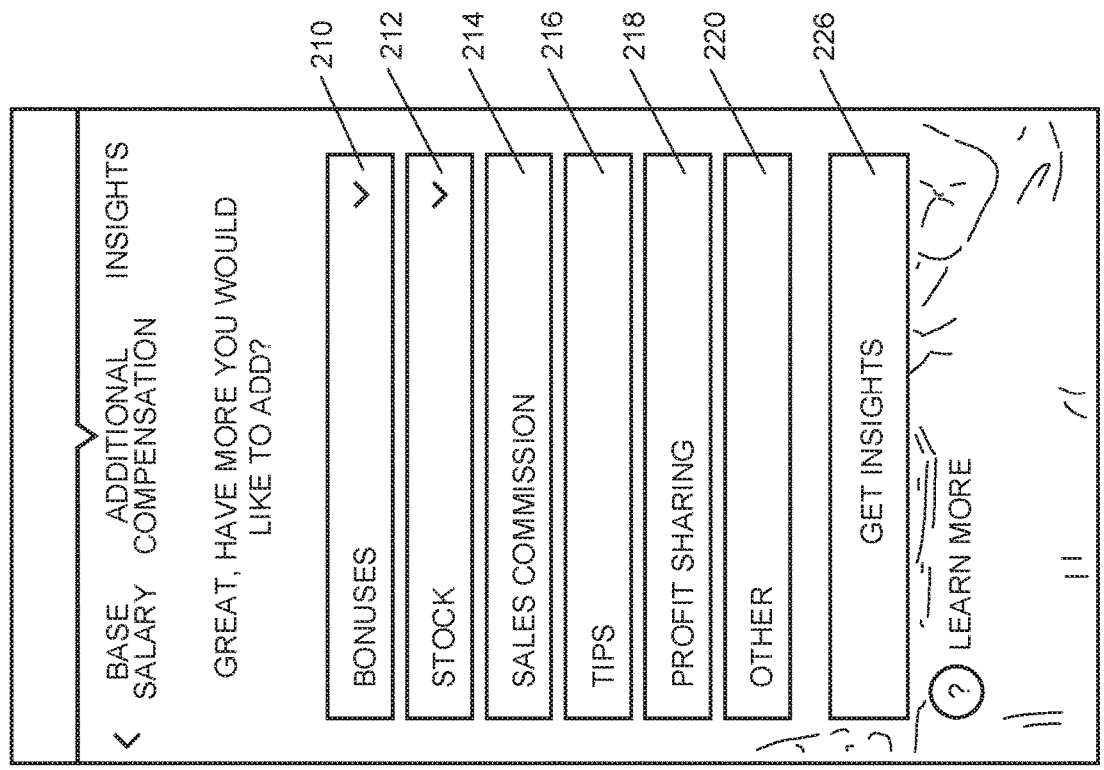
Figure 2C:
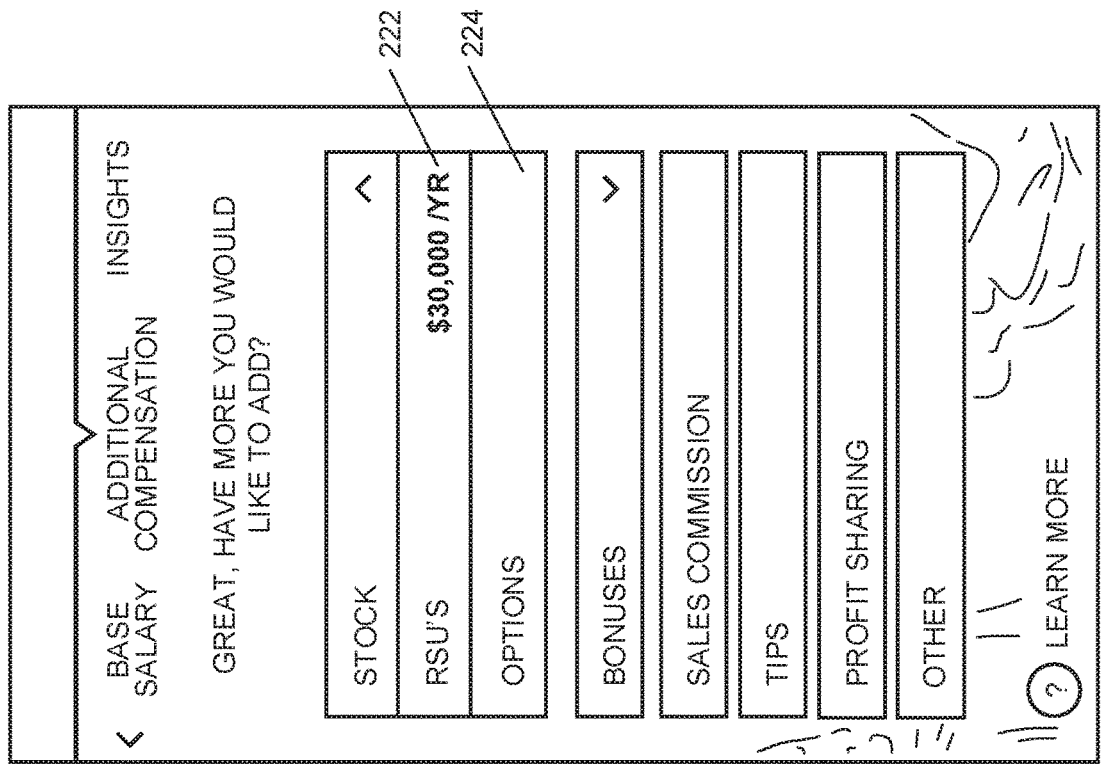

Turning now to more detail about the submission process, FIGS. 2A-2C are screen captures illustrating an example of a user interface 200 provided by the confidential data frontend 104, in accordance with an example embodiment. Referring first to FIG. 2A, the user interface 200 here is depicted as a screen of a standalone application operating on a mobile device, such as a smartphone. In FIG. 2A, the user is prompted to enter a base salary in a text box 202, with a drop-down menu providing options for different time periods on which to measure the base salary (e.g., per year, per month, per hour, etc.). Additionally, the user may be identified by name at 204, the user's title may be identified at 206, and the user's current employer may be identified at 208. This information may be prepopulated into the user interface 200, such as by retrieving this information from a member profile for the user in a social networking service. This eliminates the need for the user to enter this information manually, which can have the effect of dissuading some users from providing the confidential information or completing the submission process, especially on a mobile device where typing or otherwise entering information may be cumbersome.

Turning to FIG. 2B, here the user interface 200 displays a number of other possible compensation types 210-220 from which the user can select. Selecting one of these other possible compensation types 210-220 causes the user interface 200 to provide an additional screen where the user can submit confidential data regarding the selected compensation type 210-220. Here, for example, the user has selected "Stock" 212. Referring now to FIG. 2C, the user interface 200 then switches to this screen, which allows the user to provide various specific details about stock compensation, such as restricted stock unit (RSU) compensation 222 and options 224. The user interface 200 at this stage may also display the other compensation types 210-220 that the user can make additional submissions for.

Referring back to FIG. 2B, when the user has completed entering all the confidential data, such as all the different compensation types appropriate for his or her current job, a "Get insights" button 226 may be selected, which launches a process by which the confidential data backend 106 determines whether the user is eligible to receive insights from confidential data from other users and, if so, indicates to the confidential data backend 106 that the insights should be provided. Additionally, selection of the "Get insights" button 226 represents an indication that the submission of the confidential data by this user has been completed, causing the confidential data backend 106 to store the confidential data in the confidential information database 108 as described below, which then may trigger the databus listener 110 to extract the confidential information and cause the ETL backend 114 to anonymize the confidential data and place it in the appropriate ETL tables corresponding to the appropriate slices in which the confidential data belongs. This permits the submitted confidential data to be available for future insights.

Figure 3:
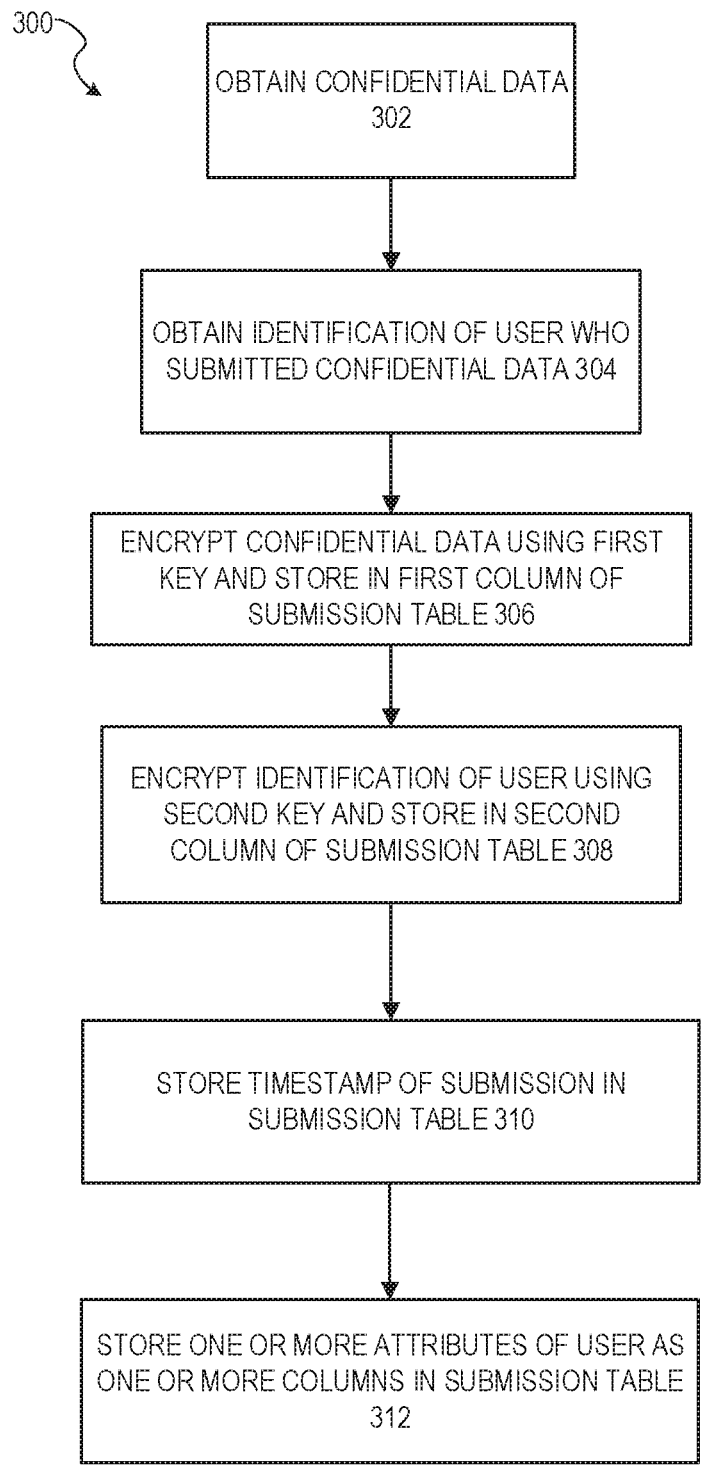
FIG. 3 is a flow diagram illustrating a method for confidential data collection and storage, in accordance with an example embodiment.

FIG. 3 is a flow diagram illustrating a method 300 for confidential data collection and storage, in accordance with an example embodiment. In an example embodiment, the method 300 may be performed by the confidential data backend 106 of FIG. 1. At operation 302, confidential data is obtained. At operation 304, an identification of the user who submitted the confidential data is obtained. It should be noted that while operations 302 and 304 are listed separately, in some example embodiments they may be performed in the same operation. For example, in an example embodiment, the confidential data frontend 104 may, upon receiving an indication from a user that input of confidential data in the confidential data frontend 104 by the user has been completed, forward the inputted confidential data and an identification of the user to the confidential data backend 106. In other example embodiments, however, the operations 302 and 304 may be performed separately. For example, in an example embodiment, the identification of the user may not be obtained directly from the confidential data frontend 104, but rather some other type of identifying information may be obtained directly from the confidential data frontend 104, and this other type of identifying information may be used to query a social networking service or other third-party service for the identification information for the user. Regardless, after operations 302 and 304 have been performed, the confidential data backend 106 has at its disposal some confidential data and identification information for the user who entered the confidential data.

It should be noted that the confidential data may be a single piece of information, or may be multiple related pieces of information. For example, the confidential data may simply include a total compensation value and nothing more, or may include a complete breakdown of different types of compensation (e.g., base salary, bonus, stock, etc.).

Users are understandably concerned about the security of the confidential information, and specifically about a malicious user being able to correlate the confidential information and the identification of the user (i.e., not just learning the confidential information but tying the confidential information specifically to the user). As such, at operation 306, the confidential data is encrypted using a first key and stored in a first column of a submission table in a confidential information database. Then, at operation 308, the identification of the user who submitted the confidential data is separately encrypted using a second key and stored in a second column of the submission table in the confidential information database.

Additionally, a number of optional pieces of information may, in some example embodiments, be stored in the submission table at this point. At operation 310, a timestamp of the submission of the confidential data may be stored in a column in the submission table. This timestamp may be used in, for example, a determination of whether the user is eligible to receive insights from confidential data submitted by other users. At operation 312, one or more attributes of the user may be stored as one or more columns in the submission table. These attributes may be used, for example, in determining to which slice(s) the confidential data may apply, as will be described in more detail below.

Figure 4:
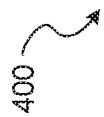
FIG. 4 is a diagram illustrating an example of a submission table, in accordance with an example embodiment.

FIG. 4 is a diagram illustrating an example of a submission table 400, in accordance with an example embodiment. Each row in the submission table 400 corresponds to a different submission. Here, the submission table 400 includes five columns. In a first column 402, confidential data encrypted by a first key is stored. In a second column 404, identification of the user who submitted the corresponding confidential data, encrypted by a second key, is stored. In a third column 406, a timestamp for the submission is stored. In a fourth column 408, a first attribute of the user, here location, is stored. In a fifth column 410, a second attribute of the user, here title, is stored. Of course, there may be additional columns to store additional attributes or other pieces of information related to the submission.

Notably, FIG. 4 depicts an example embodiment where only the first and second columns 402, 404 are encrypted, using different encryption keys. In some example embodiments, the additional columns 406-410 may also be encrypted, either individually or together. In some example embodiments, one or more of these additional columns 406-410 may be encrypted using the same key as the first or second column 402, 404. Furthermore, in some example embodiments, the submission table 400 may be additionally encrypted as a whole, using a third encryption key different from the keys used to encrypt the first and second columns 402, 404.

It should be noted that while FIGS. 3 and 4 describe the confidential data as being stored in a single column in a submission table, in some example embodiments, this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the submission table. Nevertheless, the processes described herein with regard to the "column" in which the confidential data is stored apply equally to the embodiments where multiple columns are used (e.g., the individual pieces of compensation information are still encrypted separately from the user identification information).

Figure 5:
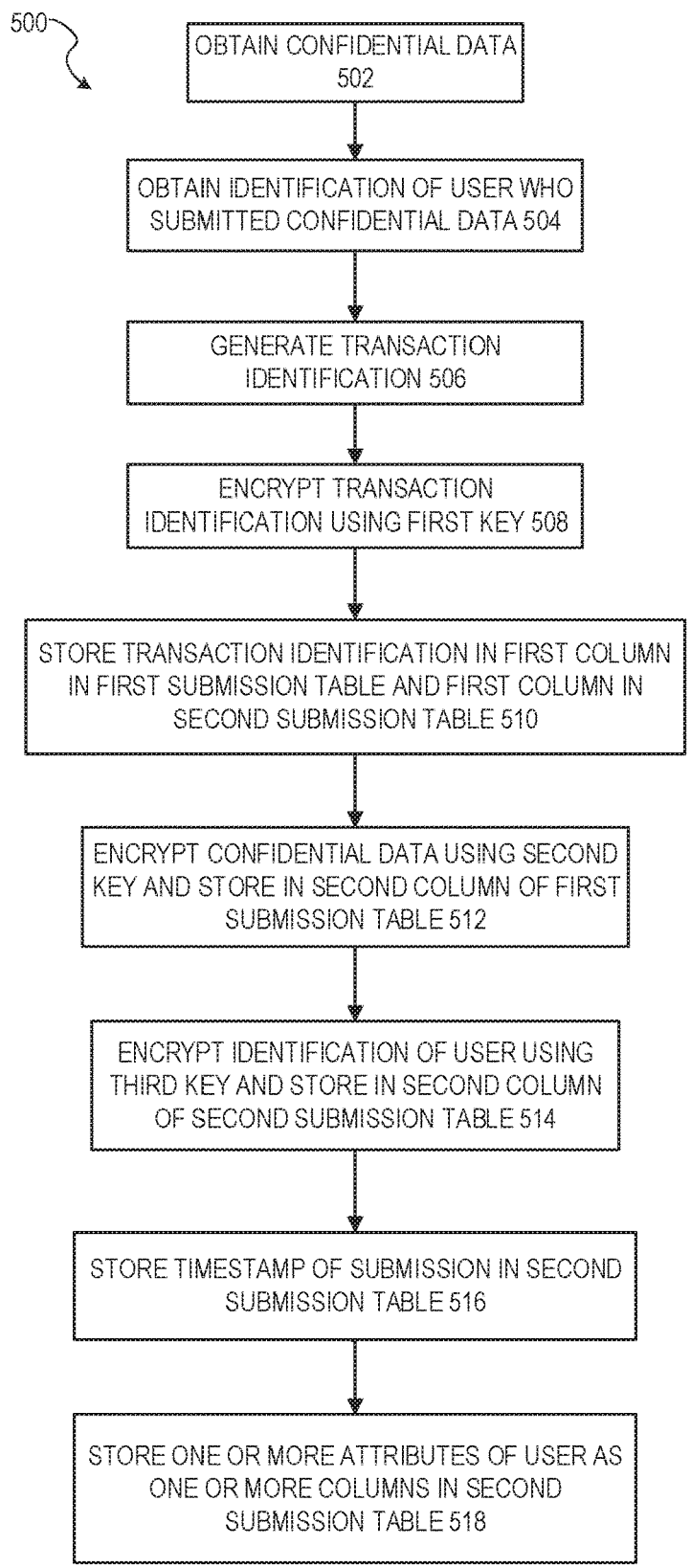
FIG. 5 is a flow diagram illustrating a method for confidential data collection and storage, in accordance with an example embodiment.

FIG. 5 is a flow diagram illustrating a method 500 for confidential data collection and storage, in accordance with an example embodiment. In contrast with FIG. 3, FIG. 5 represents an example embodiment where the confidential data and the identification of the user who submitted the confidential data are stored in separate tables in order to provide additional security. At operation 502, confidential data is obtained. At operation 504, an identification of the user who submitted the confidential data is obtained. As in FIG. 3, while operations 502 and 504 are listed separately, in some example embodiments they may be performed in the same operation.

At operation 506, a transaction identification is generated. This transaction identification may be, for example, a randomly generated number or character sequence that uniquely identifies the submission. At operation 508, the transaction identification may be encrypted using a first key. At operation 510, the transaction information (either encrypted or not, depending upon whether operation 508 was utilized) is stored in a first column in a first submission table and in a first column in a second submission table in a confidential information database.

At operation 512, the confidential data is encrypted using a second key and stored in a second column of the first submission table in the confidential information database. Then, at operation 514, the identification of the user who submitted the confidential data is separately encrypted using a third key and stored in a second column of the second submission table in the confidential information database.

Additionally, as in FIG. 3, a number of optional pieces of information may, in some example embodiments, be stored in the first and/or second submission tables at this point. At operation 516, a timestamp of the submission of the confidential data may be stored in a column in the second submission table. This timestamp may be used in, for example, a determination of whether the user is eligible to receive insights from confidential data submitted by other users. At operation 518, one or more attributes of the user may be stored as one or more columns in the second submission table. These attributes may be used, for example, in determining to which slice(s) the confidential data may apply, as will be described in more detail below. It should be noted that while operations 516 and 518 are described as placing information in the second submission table, in other example embodiments, one or more of these pieces of information may be stored in the first submission table.

If operation 508 is utilized, then the fact that the transaction identification is encrypted and is the only mechanism by which to link the confidential data in the first submission table with the user identification in the second submission table through a join operation provides an additional layer of security.

Figure 6:
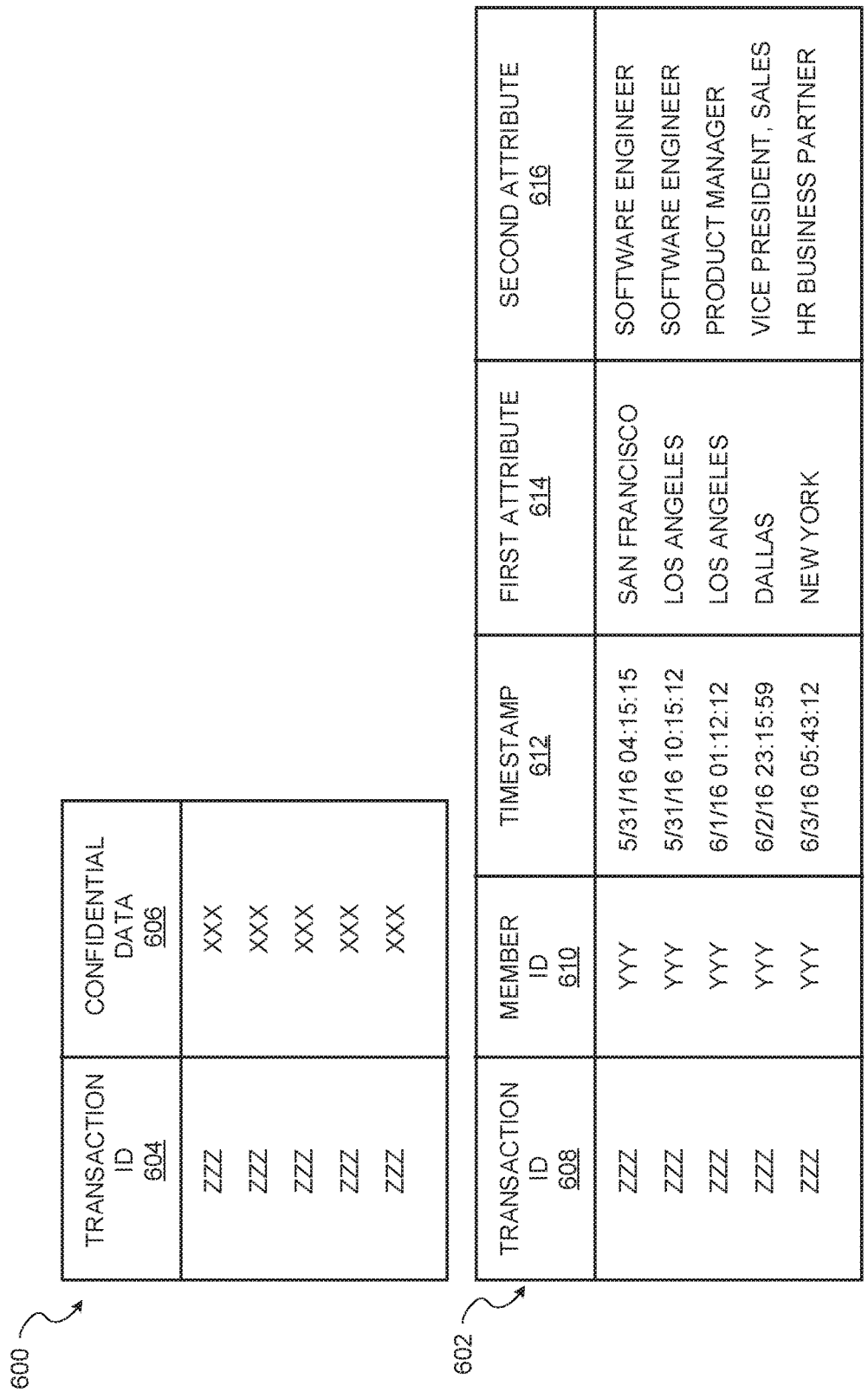
FIG. 6 is a diagram illustrating an example of a first submission table and a second submission table, in accordance with an example embodiment.

FIG. 6 is a diagram illustrating an example of a first submission table 600 and a second submission table 602, in accordance with an example embodiment. Each row in each of the first and second submission tables 600, 602 corresponds to a different submission. Here, the first submission table 600 includes two columns. In a first column 604, transaction identification information encrypted by a first key is stored. In a second column 606, confidential data encrypted by a second key is stored.

The second submission table 602 includes five columns. In a first column 608, transaction identification information encrypted by the first key is stored. In a second column 610, identification of the user who submitted the corresponding confidential data, encrypted by a third key, is stored. In a third column 612, a timestamp for the submission is stored. In a fourth column 614, a first attribute of the user (here location) is stored. In a fifth column 616, a second attribute of the user, here title, is stored. Of course, there may be additional columns to store additional attributes or other pieces of information related to the submission.

Notably, FIG. 6 depicts an example embodiment where only the first and second columns 608, 610 of the second submission table 602 are encrypted, using different encryption keys. In some example embodiments, the additional columns 612-616 may also be encrypted, either individually or together. Furthermore, in some example embodiments, the first and/or second submission tables 600, 602 may be additionally encrypted as a whole, using an additional encryption key(s) different from the keys described previously.

It should be noted that while FIGS. 5 and 6 describe the confidential data as being stored in a single column in a first submission table, in some example embodiments this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the first submission table. Nevertheless, the processes described herein with regard to the "column" in which the confidential data is stored apply equally to the embodiments where multiple columns are used (e.g., the individual pieces of compensation information are still encrypted separately from the user identification information).

Since insights from submitted confidential data will be generated and shared with users who submit confidential data, there is a concern that the submitted confidential data upon which the insights are based is reliable. Inaccuracies in the submitted confidential data, whether caused by user error, maliciousness, or system errors, could potentially cause the insights to be skewed. As such, in an example embodiment, computer operations are undertaken in order to remove or correct such incorrect confidential data after submission.

In an example embodiment, the computer operations undertaken include detection of outliers in the submitted confidential data. Outliers include any piece of submitted data that appears, after one or more analyses described below, to be out of place or incorrect. Then, one or more actions may be taken on these outliers, including, for example, removal of the outliers from the insights, requesting user resubmission or "double-checking" of the confidential data corresponding to the outliers, and the like.

In an example embodiment, outlier detection is based on one or more external data sets. These external data sets may have statistical information about confidential information that is relevant to determining whether submitted confidential information is an outlier or not. For example, in the case where the confidential information is compensation information, external data sets from, for example, the Bureau of Labor Statistics, employment agencies, employer surveys, and the like might provide information such as average compensation in particular fields, job titles in particular regions, or even more detailed statistical information such as compensation percentiles.

However, the external data sets are likely to follow a different taxonomy of professions and geographic divisions as compared to the data of the professional social networking service.

A taxonomy is a classification scheme. In the context of job titles, a job title taxonomy is a complete set of possible job titles used by an entity (e.g., the social networking service or an external entity that manages or creates the external data set). Each job description provided by a user of a social networking service is mapped to a job title in the job title taxonomy. Similarly, a taxonomy is used for location(s). For example, one entity can have a taxonomy of locations that includes zip codes, while another entity can include a taxonomy of locations that includes states, cities, counties, neighborhoods, or the like. Harmonizing data from disparate taxonomies can be challenging.

Consider a taxonomy that breaks location into zip codes and a taxonomy that breaks location into cities and greater metropolitan areas. If the city or greater metropolitan area spans multiple zip codes or does not span an entire zip code, it is difficult to determine which city or greater metropolitan area a zip code corresponds to or vice versa. In an example embodiment, the external data sets are utilized by generating mappings from the external taxonomy (a taxonomy of the external data) to internal taxonomies (a taxonomy of, for example, the social network data). The underlying mappings can be based on population and/or member demographic information for mapping regions and titles.

Percentiles in the external data set show the confidential data values for various percentiles of the overall data set. For example, the external data set may show that the 10th percentile of factory workers (the compensation that 10% of factory workers fall below) make $15,000 a year on average, while those in the 25th percentile (the compensation that 25% of factory workers fall below) make $25,000 a year on average, and so on.

In an example embodiment, one or more external data sets are used to calculate initial upper and lower limits on values for the confidential data for particular combinations of member attributes. Thus, for example, an upper and lower limit for base salary of software engineers in the San Francisco Bay Area may be calculated. In an example embodiment, Box and Whisker method is utilized in making this calculation. Specifically, an interquartile range value is calculated by subtracting the value in the external data set for the member attribute combination for the 25th percentile from the value for the 75th percentile. Thus, for example, if the external data set indicates that 25% of software engineers in the San Francisco Bay Area make less than $105,000, while 75% of software engineers in the San Francisco Bay Area make less than $175,000, then the interquartile range for software engineers in the San Francisco Bay Area is $175,000-$105,000=$70,000.

An initial lower limit is then established by calculating the following formula:

$$\text{Initial lower limit} = \max(0, 25\text{th percentile} - \text{alphaLower} * \text{interQuartileRange}).$$

An initial upper limit is then established by calculating the following formula:

$$\text{Initial upper limit} = 75\text{th percentile} + \text{alphaUpper} * \text{interQuartileRange}.$$

In these formulas, alphaLower and alphaUpper are multiplicative parameters. In an example embodiment, values for these parameters are selected based on experimentation. In some example embodiments, the values for these parameters may be the same across all industries, regions, or other attributes, but in other example embodiments the values may vary based on attribute. For example, there may be one value for the alphaLower parameter for Tech workers and a different value for the alphaLower parameter for Factory workers.

In an example embodiment, one or more extrapolation techniques are used to calculate values for percentiles not specified in the external data set. In an example embodiment, linear or spline interpolation is used as one of these extrapolation techniques. For example, with linear interpolation, the following formulas may be computed:

$$pct\backslash\text{alphaExtrapolated} = pct10*(25-\backslash\text{alpha})/(25-10) + pct25*(\backslash\text{alpha}-10)/(25-10), \text{ where } \backslash\text{alpha}=-10,0,\text{ etc.}$$

$$\backslash pct\backslash\text{betaExtrapolated} = pct90*(\backslash\text{beta}-75)/(90-75) + pct75*(90-\backslash\text{beta})/(90-75), \text{ where } \backslash\text{beta}=100,110,\text{ etc.}$$

The idea behind the above formulas is that values for outlier percentiles, such as the 0th percentile or −10th percentile, can be determined via interpolation, based on the values for the nearest two percentiles. Thus, the value for the 0th percentile may be calculated based on the values for the 10th and 25th percentiles, while the value for the 100th percentile may be calculated based on the values for the 90th and 75th percentiles.

Notably, the above calculations can be performed for each combination of attributes specified in the external data set by the same super-attributes. Specifically, the external data set may specify values on a more granular level than the member attributes for the member who submitted the confidential information that needs to be examined to determine if it is an outlier. For example, a member with the attributes "Computer Programmer" and "San Francisco Bay Area" may submit compensation information, but the Bureau of Labor Statistics may break down percentiles of compensation information based on city (e.g., Santa Clara, San Jose, etc.) and not region, and may also break down percentiles of compensation information based on specific job title (e.g., Software Product Manager, Coder, etc.) rather than on super-title or field (e.g., Computer Programmer). Thus, the above calculations may be performed for all the values in the external data set that come under the umbrella of the member attributes. The calculated values for initial lower limit, initial upper limit, pct\alphaExtrapolated, and pct\betaExtrapolated may be computed for each of the percentile ranges for the Software Product Manager/Santa Clara, Coder/Santa Clara, Software Product Manager/San Jose, and Coder/San Jose combinations (as well as any other combinations that would fall under the category of "Computer Programmer" and "San Francisco Bay Area"), and then these values may be aggregated.

At this point, a merged lower limit and merged upper limit may be computed as follows:

mergedLowerLimitExternalData=max(minWage,aggregateFuncLower(boxAndWhiskerLowerLimitAggregated,pct\alphaExtrapolatedAggregated)), where aggregateFuncLower could be chosen to be max, min, etc., boxAndWhiskerLowerLimitAggregated is the lower limit computed by the Box and Whisker method aggregated over the segments, and pct\alphaExtrapolatedAggregated is the pct/alphaExtrapolated values aggregated over the segments.

mergedUpperLimitExternalData=aggregateFuncUpper(boxAndWhiskerUpperLimitAggregated, pct\betaExtrapolatedAggregated), where aggregateFuncUpper could be chosen to be max, min, etc., boxAndWhiskerUpperLimitAggregated is the upper limit computed by the Box and Whisker method aggregated over the segments, and pct\betaExtrapolatedAggregated is the pct/betaExtrapolated values aggregated over the segments.

It should be noted that in some example embodiments the aggregateFuncLower and/or aggregateFuncUpper could be computed based on more than the two values specified, but could also include some sort of "hard limit." The main example of such a hard limit would be the federal minimum wage, which could be used to calculate a minimum compensation for a full-time worker, and this minimum compensation may be used as a floor for the mergedLowerLimitExternalData, such that even if the box AndWhiskerLowerLimitAggregated and/or pct\alphaExtrapolatedAggregated are below this floor, the values below this floor will always be seen as outliers. This is reflected in the formulas above.

Additionally, while minimum and maximum are provided as example functions for aggregateFuncLower and aggregateFuncUpper, other functions, such as averages and weighted averages, could alternatively be used. The weights for the weighted average may be altered over time via machine learning algorithms. Additionally, the parameters used for the other calculations described above could also be learned via machine learning algorithms.

Figure 7:
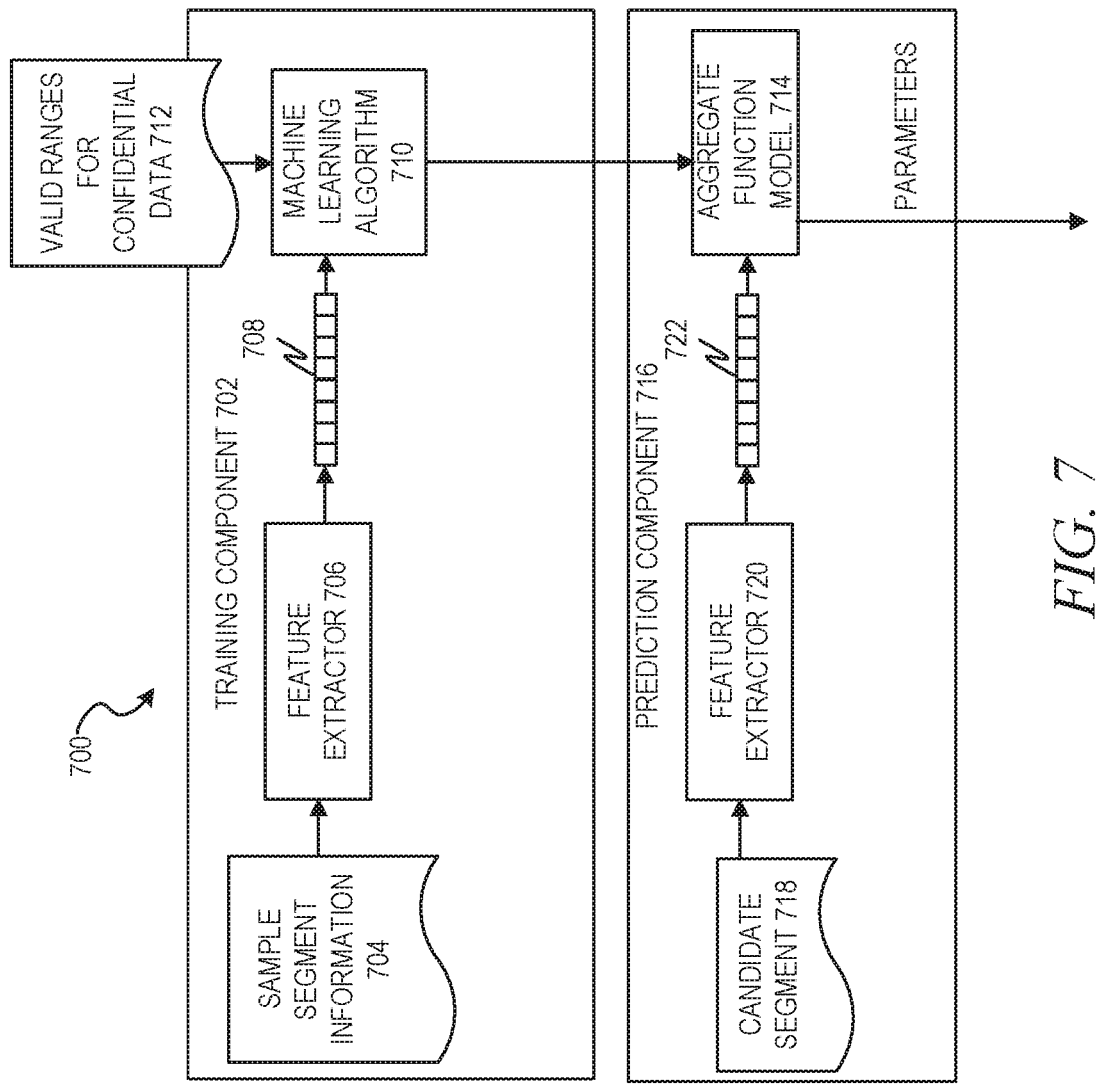
FIG. 7 is a block diagram illustrating an aggregate function machine learning algorithm component, in accordance with an example embodiment.

FIG. 7 is a block diagram illustrating an aggregate function machine learning algorithm component 700, in accordance with an example embodiment. In some example embodiments, the aggregate function machine learning algorithm component 700 may be located on the confidential data backend 106.

In a training component 702, sample segment information 704 from sample segment data is fed to a feature extractor 706, which acts to extract curated features 708 from the sample segment information 704.

Thus, for example, the feature extractor 706 may extract features such as segment attributes (e.g., location, title, etc.) from the sample segment information 704. Extraction may be performed via a number of different extraction techniques. In a simple case, the attributes may be directly extracted from the sample segment information 704. In other example embodiments, more complex transformations and/or pre-processing may be performed, such as mapping of the segment attributes to social network attribute taxonomy categories.

The curated features 708 may be fed to a machine learning algorithm 710 along with known valid ranges for confidential data 712 for each of the segments in the sample segment information 704. The machine learning algorithm 710 then trains an aggregate function model 714 based on the curated features 708 and known valid ranges for confidential data 712. The machine learning algorithm 710 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck method. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

Specifically, the aggregate function model 714 may be trained to output parameters used in the outlier detection techniques described above and below, specifically, for example, initial upper limits and initial lower limits. Other parameters, such as alphaUpper and alphaLower parameters, and weights for the aggregation functions, may also be output by the aggregate function model 714.

In a prediction component 716, a candidate segment 718 is fed to a feature extractor 720, which acts to extract curated features 722 from the candidate segment 718. The curated features 722 are then used as input to the trained aggregate function model 714, which outputs parameters used for the outlier detection.

It should be noted that while the feature extractor 706 and the feature extractor 720 are depicted as separate components, they may be the same component in some example embodiments. Additionally, a large number of different types of features could be extracted using the feature extractors 706 and 720. Furthermore, while in an example embodiment the features extracted by the feature extractor 706 are the same as the features extracted by the feature extractor 720, in other example embodiments there may be differences in the features.

Figure 8:
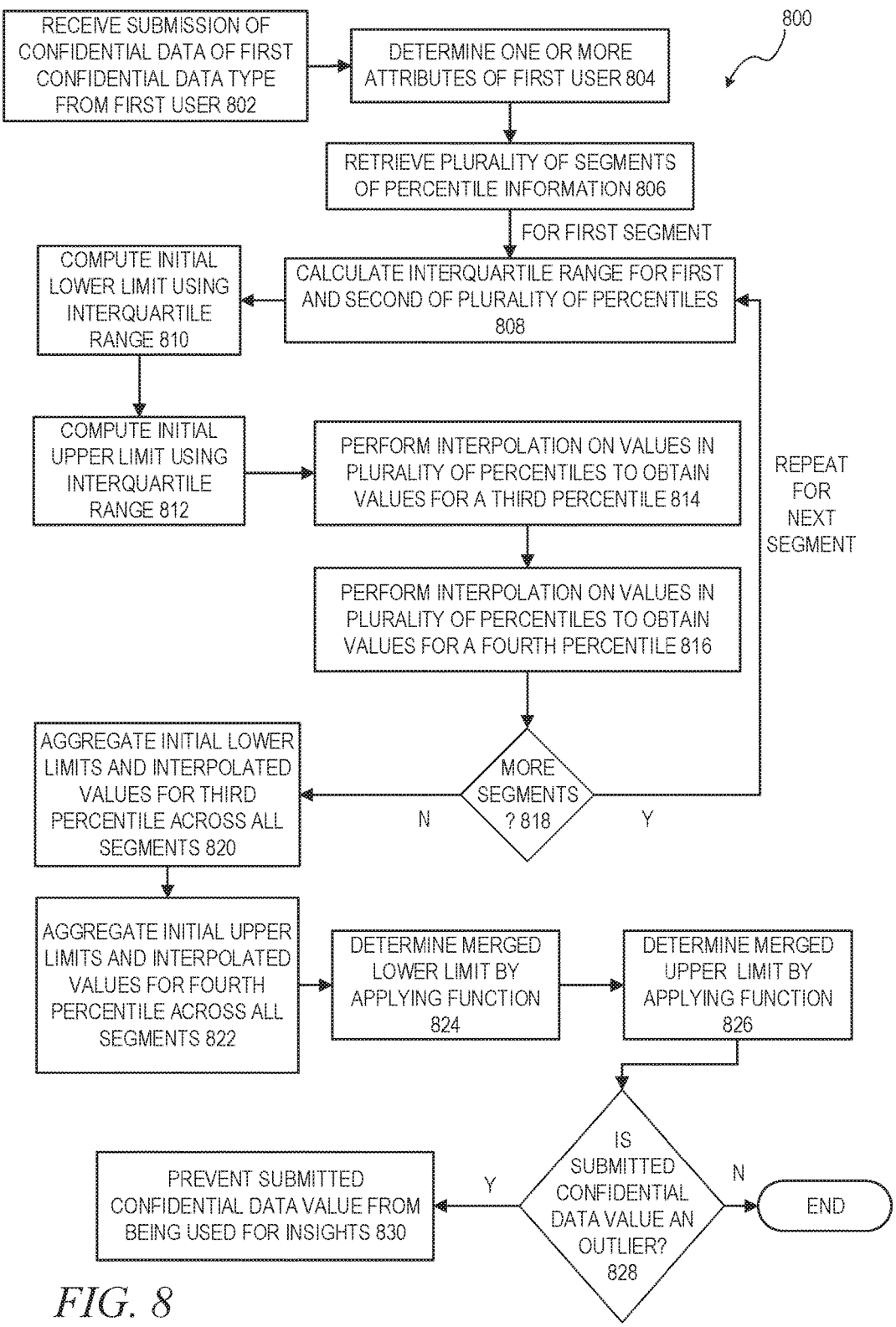
FIG. 8 is a flow diagram depicting a method for handling confidential data submitted by a user in a computer system, in accordance with an example embodiment.

FIG. 8 is a flow diagram depicting a method 800 for handling confidential data submitted by a user in a computer system, in accordance with an example embodiment. The method 800 may be performed at, for example, the confidential data relevance workflow 120 of FIG. 1.

At operation 802, a submission of confidential data of a first confidential data type is received from a first user via a first computerized user interface. At operation 804, one or more attributes of the first user are determined. This determination may be based on attributes that are commonly used by third-party data sources to segregate statistical data gathered about confidential data. For example, third-party data sources often segregate gathered data on compensation based on job title or industry and location. Therefore, in some example embodiments, the one or more attributes may include job title and location. It should be noted that due to the hierarchical nature of many of these types of attributes, it may be common for the statistical data to be segregated at a more granular level than the one or more attributes, or at least at a level which the one or more attributes may be generalized to. As was described earlier, such instances can be compensated for later in the method 800 through aggregation. Therefore, at operation 804, the one or more attributes of the first user may be determined at a level at which information is available. One common source for attribute information for the first user may be a member profile in a social networking service, where such attributes may be explicitly listed. However, it is not necessary that the attribute information be retrieved from a member profile, or even that the attribute information be explicitly listed (e.g., it can be inferred as well).

At operation 806, a plurality of segments of percentile information indicating values for confidential data of the first confidential data type for a plurality of users matching the one or more attributes of the first user are retrieved from an external data source. For purposes of this disclosure, "matching" shall be interpreted as meaning that the segment is relevant to the one or more attributes of the first user. This may mean that the segment has been segregated based on one of the attributes itself, or based on a sub-attribute of the attribute. For example, the first user may have a job title of "Computer Programmer" and a location of "San Francisco Bay Area," and thus segments including "Software Product Manager"/"San Jose" and "Software Product Manager"/"Santa Clara" may both be considered matches (assuming "Software Product Manager" is a sub-attribute of "Computer Programmer" in the title taxonomy), but segments including "Software Product Manager"/"Los Angeles" and even "Computer Programmer"/"New York" may not be considered matches. Additionally, segments segregated at a higher attribute level in the taxonomy may also be considered a match, such as a segment including "Software Product Manager"/"California," since California contains the San Francisco Bay Area and is therefore a super-attribute in the taxonomy.

Furthermore, segments that have not been segregated at all along the taxonomy of one of the attributes may also be considered a match. For example, if the segment is for "Software Product Manager" but no location is specified, the segment still may be considered a match.

Thus, each of the plurality of segments includes values, for a different combination of attributes of the plurality of users, for data of the first confidential data type for each of a plurality of percentiles.

A loop is then begun for each of the segments. At operation 808, an interquartile range for a first and a second of the plurality of percentiles in the segment is calculated, wherein the value for the first of the plurality of percentiles is lower than the value for the second of the plurality of percentiles. Then, at operation 810, an initial lower limit for the segment is computed by taking a maximum of zero or the difference between the value for the first of the plurality of percentiles and a product of a preset alpha parameter and the interquartile range. At operation 812, an initial upper limit is computed for the segment by adding the value for the second of the plurality of percentiles to a product of a preset beta parameter and the interquartile range.

At operation 814, interpolation is performed on the values for the plurality of percentiles for the segment to obtain values for a third percentile. At operation 816, interpolation is performed on the values for the plurality of percentiles for the segment to obtain values for a fourth percentile. In both operations 814 and 816, this interpolation may be, for example, based on linear interpolation or spline interpolation. The third percentile may have a lower value that any percentile in the plurality of percentiles and the fourth percentile may have a higher value than any percentile in the plurality of percentiles. Furthermore, in some example embodiments, the third percentile is below zero percent and/or the fourth percentile is above one hundred percent.

At operation 818, it is determined if there are any more segments. If so, then the method 800 loops back to operation 808 for the next segment in the plurality of segments. If not, then at operation 820 the initial lower limits and the interpolated values for the third percentile are aggregated across the segments. Then, at operation 822, the initial upper limits and the interpolated values for the fourth percentile are aggregated across the segments.

At operation 824, a merged lower limit is determined by applying a function to the aggregated initial lower limit and aggregated interpolated values for the third percentile. At operation 826, a merged upper limit is determined by applying a function to the aggregated initial upper limit and aggregated interpolated values for the fourth percentile.

At operation 828, it is determined whether the confidential data value submitted by the first user is an outlier by determining if the confidential data value submitted by the first user is lower than the merged lower limit or higher than the merged upper limit. At operation 830, in response to a determination that the confidential data value submitted by the first user is an outlier, the confidential data value submitted by the first user is prevented from being used for insights provided to other users. This prevention may take many forms, including, for example, removing the submitted confidential data value from the DFS 118, or simply not providing insights into the confidential data insights data store 122 using that particular submitted confidential data value.

There may be some limitations to using external data sets to detect outliers, however. One limitation is that typically the external data sets are limited to just one particular type of confidential data. For example, the Bureau of Labor Statistics may keep percentiles reflecting base salary, but not bonuses, stock compensation, or the like, or may simply keep percentiles reflecting overall compensation, without breaking it down into the types of compensation. Additionally, in some cases the mapping between the taxonomies of the external data set and the social networking service may be noisy, making the derived limits unreliable. Furthermore, there may be some segments that lack data; for example, certain titles and/or locations may not be tracked. In such cases, it may be desirable to perform outlier detection based on information from other members of the social networking service rather than an external data set.

In an example embodiment, grouped internal confidential data (e.g., confidential data gathered through user submission to a social networking service) is used to calculate initial upper and lower limits on values for the confidential data for particular combinations of member attributes. Thus, for example, an upper and lower limit for base salary of software engineers in the San Francisco Bay Area may be calculated.

Specifically, the internal confidential data is grouped based on cohort. Each cohort c represents a grouping of data pertaining to a particular combination of user attributes for users who submitted the confidential data. Thus, for example, a cohort may be for a particular title and region combination, such as "Computer Programmer" and "San Francisco Bay Area," or a particular title, company, and region combination, such as "Computer Programmer," "XYZ Corp." and "San Francisco Bay Area." A first step then involves obtaining the set E(c) of all submitted entries for that cohort. Each element of E(c) is an ordered r-tuple of confidential data values, where r is the number of types for the data. For example, if the confidential data is compensation information, the types may include base salary, bonus, stock, tips, etc. Data for some of the types may be missing. For example, while some users may submit base salary, bonus, and stock (and not tips), others may submit base salary and tips (and not bonus or stock). For each individual confidential data type t, let E(c, t) denote the set of submitted values that are non-null for cohort c.

Data from E(c, t) for each matching cohort c may then be aggregated to create percentiles based on the submitted data values. In an example embodiment, the 25th, 50th, and 75th percentiles may be computed.

For each matching cohort, an initial lower and upper limit may then be calculated. In an example embodiment, Box and Whisker method is utilized in making this calculation. Specifically, an interquartile range value is calculated by subtracting the value in the data set for the member attribute combination for the 25th percentile from the value for the 75th percentile.

An initial lower limit is then established by calculating the following formula:

Initial lower limit=max(0,25th percentile–
alphaLower*interQuartileRange).

An initial upper limit is then established by calculating the following formula:

Initial upper limit=75th percentile+
alphaUpper*interQuartileRange.

In these formulas, alphaLower and alphaUpper are multiplicative parameters. In an example embodiment, values for these parameters are selected based on experimentation. In some example embodiments, the values for these parameters may be the same across all industries, regions, or other attributes, but in other example embodiments the values may vary based on attribute. For example, there may be one value for the alphaLower parameter for Tech workers and a different value for the alphaLower parameter for Factory workers.

The lower limit may then be set based on the calculated initial lower limit. Certain types of confidential data have an alternative lower limit, which may be higher than the initial lower limit. For example, base salary may be a confidential data type that has an alternative lower limit equal to the annualized federal minimum wage. If that annualized federal minimum wage is higher than the calculated initial lower limit, then the annualized federal minimum wage may be taken as the final lower limit for the cohort/compensation type combination. Otherwise, the initial lower limit may be taken as the final lower limit for the cohort/compensation type combination. Likewise, certain confidential data types may have an alternative upper limit, which may be greater than the initial upper limit.

Once the final lower and upper limits are determined, then user-submitted values may be removed or clipped based on these limits. How this removal or clipping occurs may differ based on the confidential data type in which the outlier lies. For example, if the outlier lies in the base salary submitted by a member of cohort c, then the entire r-tuple entry may be removed as an outlier. For other compensation types, however, such as bonus, data may be removed or clipped according to different rules. As an example, the rules may specify that a null entry is retained as-is, a non-null entry below the final lower limit is set to the final lower limit, and a non-null entry above the final upper limit is set to the final upper limit.

In an example embodiment, the parameters used in the above outlier calculations may be set using one or more machine learning algorithms. These machine learning algorithms may operate, for example, in the manner described above with respect to FIG. 7.

Figure 9:
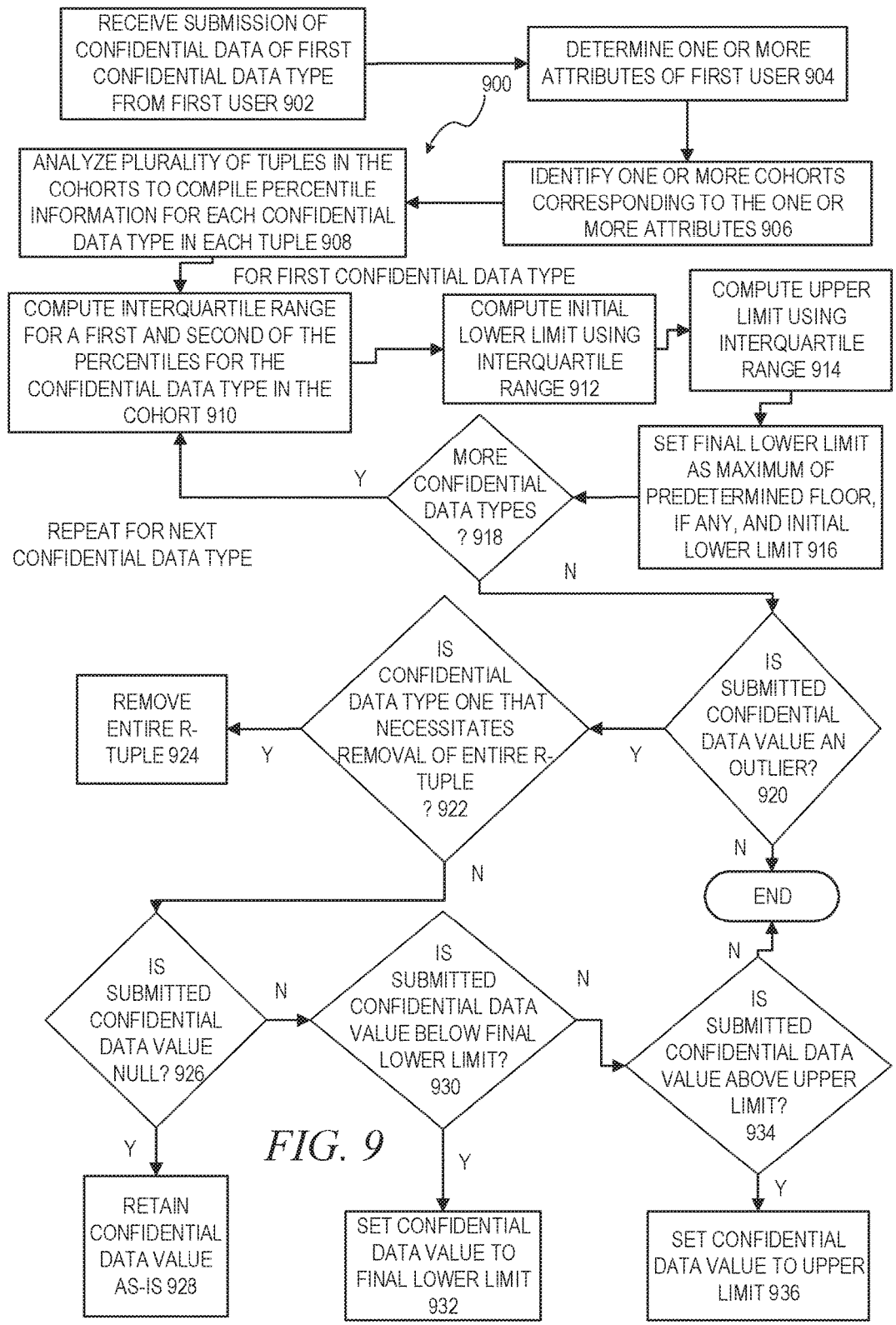
FIG. 9 is a flow diagram depicting a method for handling confidential data submitted by a user in a computer system, in accordance with another example embodiment.

FIG. 9 is a flow diagram depicting a method 900 for handling confidential data submitted by a user in a computer system, in accordance with another example embodiment. The method 900 may be performed at, for example, the confidential data relevance workflow 120 of FIG. 1.

At operation 902, a submission of confidential data of a first confidential data type is received from a first user via a first computerized user interface. In an example embodiment, this submission may take the form of an r-tuple, as described above. At operation 904, one or more attributes of the first user are determined. The one or more attributes of the first user may be determined at a level at which information is available. One common source for attribute information for the first user may be a member profile in a social networking service, where such attributes may be explicitly listed. However, it is not necessary that the attribute information be retrieved from a member profile, or even that the attribute information be explicitly listed (e.g., it can be inferred as well).

At operation 906, one or more cohorts corresponding to the one or more attributes are identified. These cohorts are various combinations of the one or more attributes for which there exist submitted member confidential data values in a database, such as in the DFS 118. The decision as to whether or not a cohort corresponds to the one or more attributes may, in some example embodiments, be similar to the decision as to whether a segment of an external data set "matches" one or more attributes, as described above. Specifically, it shall be interpreted as meaning that the cohort is relevant to the one or more attributes of the first user. This may mean that the cohort is grouped based on one of the attributes itself, or based on a sub-attribute of the attribute. For example, the first user may have a job title of "Computer Programmer" and a location of "San Francisco Bay Area," and thus cohorts including "Software Product Manager"/"San Jose" and "Software Product Manager"/"Santa Clara" may both be considered matches (assuming "Software Product Manager" is a sub-attribute of "Computer Programmer" in the title taxonomy), but cohorts including "Software Product Manager"/"Los Angeles" and even "Computer Programmer"/"New York" may not be considered matches. Additionally, cohorts segregated at a higher attribute level in the taxonomy may also be considered a match, such as a cohort including "Software Product Manager"/"California," since California contains the San Francisco Bay Area and is therefore a super-attribute in the taxonomy.

Furthermore, cohorts that have not been segregated at all along the taxonomy of one of the attributes may also be considered a match. For example, if the cohort is for "Software Product Manager" but no location is specified, the cohort still may be considered a match.

At operation 908, a plurality of tuples in the cohorts may be analyzed to compile percentile information for each confidential data type in each tuple. A loop may then be begun for each confidential data type in the cohort.

At operation 910, an interquartile range for a first and a second of the plurality of percentiles in the percentile information for the confidential data type in this cohort is calculated, wherein the value for the first of the plurality of percentiles is lower than the value for the second of the plurality of percentiles. Then, at operation 912, an initial lower limit for the confidential data type and cohort is computed by taking a maximum of zero or the difference between the value for the first of the plurality of percentiles and a product of a preset alpha parameter and the interquartile range. At operation 914, an upper limit is computed for the confidential data type and cohort by adding the value for the second of the plurality of percentiles to a product of a preset beta parameter and the interquartile range.

At operation 916, a final lower limit may be set as the maximum of a predetermined floor (e.g., annualized federal minimum wage for base salary) for the confidential data type, if any, and the initial lower limit. For all other confidential data types, the final lower and upper limits may simply be set as the initial lower and upper limits, respectively.

At operation 918, it is determined if there are any more confidential data types in the cohort. If so, then the method 900 loops back to operation 910.

If not, then at operation 920, it is determined whether the confidential data value submitted by the first user is an outlier by determining if the confidential data value submitted by the first user is lower than the final lower limit or higher than the final upper limit. If so, then at operation 922, it is determined whether the confidential data value is of a type that necessitates removal of the entire r-tuple, such as if the outlier confidential data type is base salary. If so, then at operation 924, the entire r-tuple is removed. "Removed" means removed from inclusion in insights provided to users, although in some cases this removal may include purging the r-tuple completely. If at operation 922 it is determined that the confidential data value is not of a type that necessitates removal of the entire r-tuple, then at operation 926 it is determined whether the submitted confidential data value is null. If so, then at operation 928 the confidential data value is retained as-is.

If not, then at operation 930 it is determined whether the submitted confidential data value is below the final lower limit for that confidential data value type in the cohort of the user who submitted it. If so, then at operation 932 the confidential data value is set to the final lower limit. If not, then at operation 934 it is determined if the submitted confidential data value is above the upper limit for that confidential data value type in the cohort of the user who submitted it. If so, then at operation 936 the confidential data value is set to the upper limit.

In another example embodiment, rather than, or in conjunction with, detecting outliers based on percentiles (from external or internal data sets, as described above), submitted confidential data is compared to how well it fits to a designed distribution. First, multiple confidential data submissions are grouped into cohorts at a generalized level to determine an empirical probability distribution. This may involve removing one of the attributes of the initial cohort of grouped confidential data submissions or moving one or more attributes of the initial cohort up one level in a hierarchy. For example, if an initial cohort of submitted data includes a tuple including title, company, and region as attributes, then this cohort may be generalized to title and region. If the initial cohort includes a tuple including title and city, then this cohort may be generalized to title and region, or title and state, or title and country. If the initial cohort includes a tuple including title and region, then this cohort may be generalized to function and region.

It should be noted that this generalization may be based on the number of data points (submitted confidential data) in the cohort and involves an attempt to increase the number of data points in the cohort beyond a predetermined threshold. As such, it is possible that the initial cohort already has more data points than the predetermined threshold and thus no generalization is necessary. If that is not the case, however, then a systematic algorithm for finding a generalized version of the cohort that does have more data points than the predetermined threshold may be followed. This algorithm may involve attempting to remove each attribute of the initial cohort to form intermediate cohorts and measuring the number of data points in each intermediate cohort. Likewise, each attribute of the initial cohort is generalized up one level in a hierarchy to form additional intermediate cohorts and the number of data points in each of these intermediate cohorts is also measured. The intermediate cohort with the greatest number of data points is then selected and the number of data points in the selected intermediate cohort is compared with the predetermined threshold. If the number of data points in the selected intermediate cohort exceeds the predetermined threshold, then the selected intermediate cohort is selected as the final cohort. If not, however, the algorithm repeats for the selected intermediate cohort, generalizing its attributes by removing each and moving each up one level to form another set of intermediate cohorts, and then comparing the number of data points in this other set of intermediate cohorts to the predetermined threshold. The process repeats until an intermediate cohort is found with more data points than the predetermined threshold, and such an intermediate cohort is selected as the final cohort.

In another example embodiment, rather than selecting a single cohort as the final cohort to use in calculating upper and lower limits, two or more of the intermediate cohorts are selected and, as will be described in more detail below, the upper and lower limits are calculated based on a weighted average of upper and lower limits calculated from the two or more intermediate cohorts. The weights may be dynamically learned based on a machine learning model.

Figure 10:
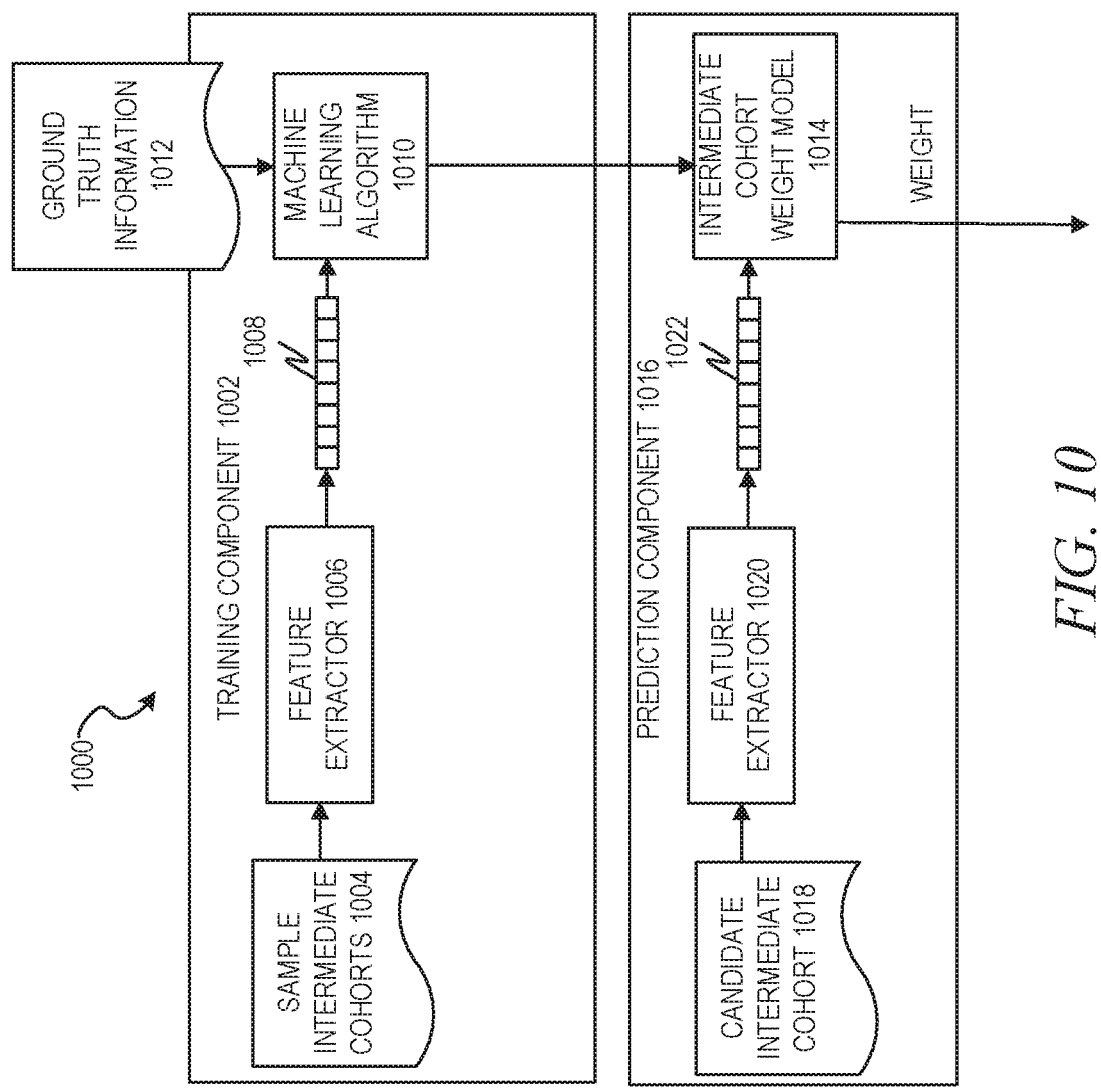
FIG. 10 is a block diagram illustrating an intermediate cohort weight learning algorithm component, in accordance with an example embodiment.

FIG. 10 is a block diagram illustrating an intermediate cohort weight learning algorithm component 1000, in accordance with an example embodiment. In some example embodiments, the intermediate cohort weight learning algorithm component 1000 may be located on the confidential data backend 106.

In a training component 1002, sample intermediate cohorts 1004 are fed to a feature extractor 1006, which acts to extract curated features 1008 from the sample intermediate cohorts 1004.

Thus, for example, the feature extractor 1006 may extract features such as the upper and lower limits from the sample intermediate cohorts 1004. The curated features 1008 may be fed to a machine learning algorithm 1010 along with ground truth information 1012 for each of the sample intermediate cohorts 1004. The ground truth would consist of valid and invalid compensation entries for each of one or more cohorts. Then, for each cohort, sample intermediate cohorts and the associated limits are computed, and the weights for intermediate cohorts are learned using a machine learning algorithm that attempts to preserve valid compensation entries and prune invalid compensation entries. The machine learning algorithm 1010 then trains an intermediate cohort weight model 1014 based on the curated features 1008 and ground truth information 1012. The machine learning algorithm 1010 may be selected from among many different potential supervised or unsupervised machine learning algorithms. Examples of supervised machine learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck method. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors).

Specifically, the intermediate cohort weight model 1014 may be trained to output weights to intermediate cohorts.

In a prediction component 1016, a candidate intermediate cohort 1018 is fed to a feature extractor 1020, which acts to extract curated features 1022 from the candidate intermediate cohort 1018. The curated features 1022 are then used as input to the trained intermediate cohort weight model 1014, which outputs a weight for each submitted candidate intermediate cohort 1018.

It should be noted that while the feature extractor 1006 and the feature extractor 1020 are depicted as separate components, they may be the same component in some example embodiments. Additionally, a large number of different types of features could be extracted using the feature extractors 1006 and 1020. Furthermore, while in an example embodiment the features extracted by the feature extractor 1006 are the same as the features extracted by the feature extractor 1020, in other example embodiments there may be differences in the features.

In some example embodiments, the intermediate cohorts included in the weighted average include all possible generalizations of the initial cohort, albeit with some of the weights assigned perhaps making the contribution of some of the more error-prone generalizations negligible. In other example embodiments, some sort of threshold is used to determine whether or not to include an intermediate cohort in the weighted average, such as the total number of data points in each cohort, as described above, or a calculated error value for the cohort with respect to a fitted parameterized distribution.

Once the final cohort(s) are selected in accordance with one of the methods described above, a parameterized distribution is then fitted to the data points in the final cohort. In an example embodiment, the parameterized distribution is a Johnson distribution. Fitting data with a Johnson distribution involves transforming a continuous random variable x, whose distribution is unknown, into a standard normal (z) with mean zero and variance of one, according to one of four normalizing translations.

The general form of the translation is $$z = \gamma + \delta f\left(\frac{x - \xi}{\lambda}\right)$$

where $z \sim N(0, 1)$, $\gamma$ and $\delta$ are shape parameters, $\lambda$ is a scale parameter, and $\xi$ is a location parameter. The translation functions that map different distributions to the standard normal distribution in the Johnson distribution function are as follows:

$$f(y) = \begin{cases} \ln(y) & \text{for lognormal family}(S_L), \\ \ln\left[y + \sqrt{y^2 + 1}\right] & \text{for unbounded family}(S_U), \\ \ln\left[\frac{y}{1-y}\right] & \text{for bounded family}(S_B), \\ y & \text{for normal family}(S_N), \end{cases}$$

where $y = (x - \xi)/\lambda$. If the general form is an exact normalizing translation of x to a standard normal random variable, the cumulative density function (CDF) of x is given by $F(x) = \Phi(z)$ for all $x \in H$, where $\Phi(z)$ denotes the CDF of the standard normal distribution, and the space H of x is $$H = \begin{cases} [\xi, +\infty) & \text{for lognormal family}(S_L), \\ (-\infty, +\infty) & \text{for unbounded family}(S_U), \\ [\xi, \xi + \lambda] & \text{for bounded family}(S_B), \\ (-\infty, +\infty) & \text{for normal family}(S_N), \end{cases}$$

The probability density function (PDF) of x is then given by $$p(x) = \frac{\delta}{\lambda\sqrt{2\pi}} f'(y) \exp\left\{-\frac{1}{2}[\gamma + \delta f(y)]^2\right\},$$

where $f'(y) = df/dy$. There are four methods to estimate Johnson parameters ($\gamma$, $\delta$, $\xi$, $\lambda$), namely moment matching, percentile matching, least squares, and minimum Lp norm estimation. The moment matching method involves determining the family distribution first by the location of skewness $\beta 1$ and kurtosis $\beta 2$. The number of parameters to be estimated is then determined by solving a system of non-linear equations between the sample moments and the corresponding moments of the fitted distribution. Briefly, this involves the following:

1. Calculate the moments of x: m2, m3, and m4.
2. Calculate the skewness and kurtosis of x: $\beta 1 = m2\ 3/m3\ 2$ and $\beta 2\ m4/m2\ 2$
3. Determine the family or transformation function used based on the above.

The upper and lower limits can then be set based on the estimated parameters from the fitting process. This may involve, for example, identifying the upper and lower bounds for the data points in the fitted distribution such that the estimated parameters indicate an error rate greater than a predetermined threshold. For example, if the error rate is set to 2.5%, then the upper and lower limits for a cohort are set based on the parameters for the fitted Johnson distribution for that cohort that indicate that 95% of all data points in the cohort would likely lie between the upper and lower limits.

In the case where there is a single final cohort, the above procedure results in an identification of the final upper and lower limits. In the case where there are multiple final cohorts, as described briefly above, a weighted average of the upper and lower limits from the multiple final cohorts may be determined, with the weights either being preassigned or dynamically determined based on machine learning. The result is final upper and lower limits determined either from a single final cohort or from a weighted average of upper and lower limits from multiple final cohorts.

Notably, the procedure above may be repeated for each confidential data type. For example, in the case of compensation information, the procedure above can be used to set upper and lower limits for salary, bonus, and stock compensation independently.

The upper and lower limits can then be used to prevent outlier data points from being used for insights provided to other users. This prevention may take many forms, including, for example, removing the submitted confidential data value from the DFS 118, or simply not providing insights into the confidential data insights data store 122 using that particular submitted confidential data value. Additionally, some confidential data types (e.g., base salary in compensation data) may, if determined to be an outlier, cause related confidential data (e.g., bonus, stock compensation) from the same submission to also be prevented from being used for insights provided to other users. In other words, some types of confidential data are such that, if an outlier is detected, the entire r-tuple is discarded or otherwise not used for insights, while some types of confidential data are such that only those particular confidential data types within the r-tuple are discarded or otherwise not used for insights.

Figure 11:
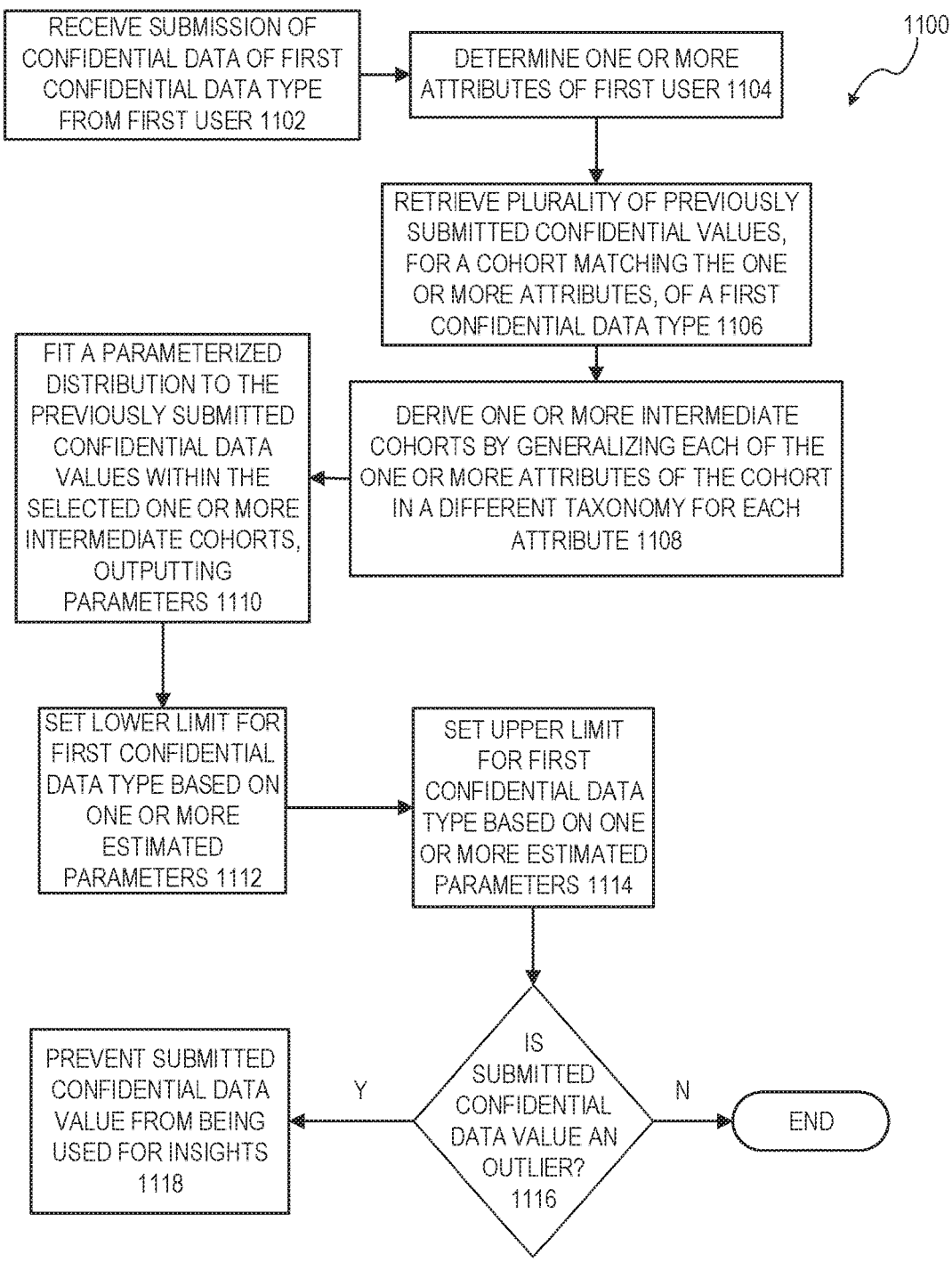
FIG. 11 is a flow diagram depicting a method for handling confidential data submitted by a user in a computer system, in accordance with another example embodiment.

FIG. 11 is a flow diagram depicting a method 1100 for handling confidential data submitted by a user in a computer system, in accordance with another example embodiment. The method 1100 may be performed at, for example, the confidential data relevance workflow 120 of FIG. 1.

At operation 1102, a submission of confidential data of a first confidential data type is received from a first user via a first computerized user interface. In an example embodiment, this submission may take the form of an r-tuple, as described above. At operation 1104, one or more attributes of the first user are determined. The one or more attributes of the first user may be determined at a level at which information is available. One common source for attribute information for the first user may be a member profile in a social networking service, where such attributes may be explicitly listed. However, it is not necessary that the attribute information be retrieved from a member profile, or even that the attribute information be explicitly listed (e.g., it can be inferred as well).

At operation 1106, a plurality of previously submitted confidential data values, for a cohort matching the one or more attributes of the first user, of the first confidential data type, are retrieved. At operation 1108, one or more intermediate cohorts are derived by generalizing each of the one or more attributes of the cohort up at least one level in a different taxonomy corresponding to each of the one or more attributes. As described above, there may be multiple ways this operation may be performed.

Figure 12:
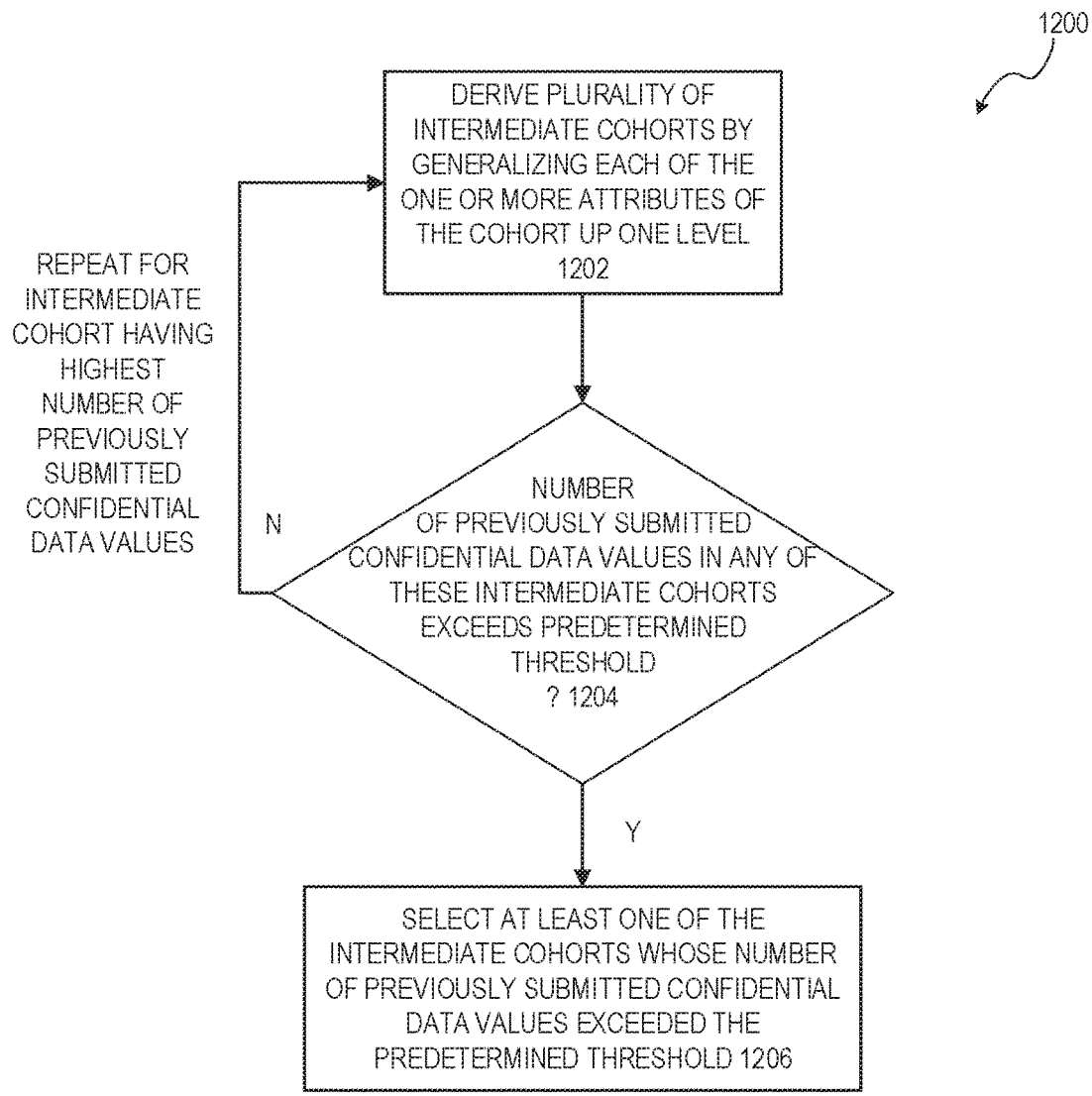
FIG. 12 is a flow diagram illustrating a method of deriving one or more intermediate cohorts, in accordance with a first example embodiment.

FIG. 12 is a flow diagram illustrating a method 1200 of deriving one or more intermediate cohorts at operation 1108, in accordance with a first example embodiment. At operation 1202, a plurality of intermediate cohorts are derived by generalizing each of the one or more attributes of the cohort up one level. At operation 1204, it is determined if the number of previously submitted confidential data values in at least one of these intermediate cohorts exceeds a predetermined threshold. If so, then at operation 1206, at least one of the intermediate cohorts whose number of previously submitted confidential data values exceeded the predetermined threshold is selected. If not, then the method 1200 loops back to operation 1202 for the intermediate cohort having the highest number of previously submitted confidential data values of the intermediate cohorts.

Figure 13:
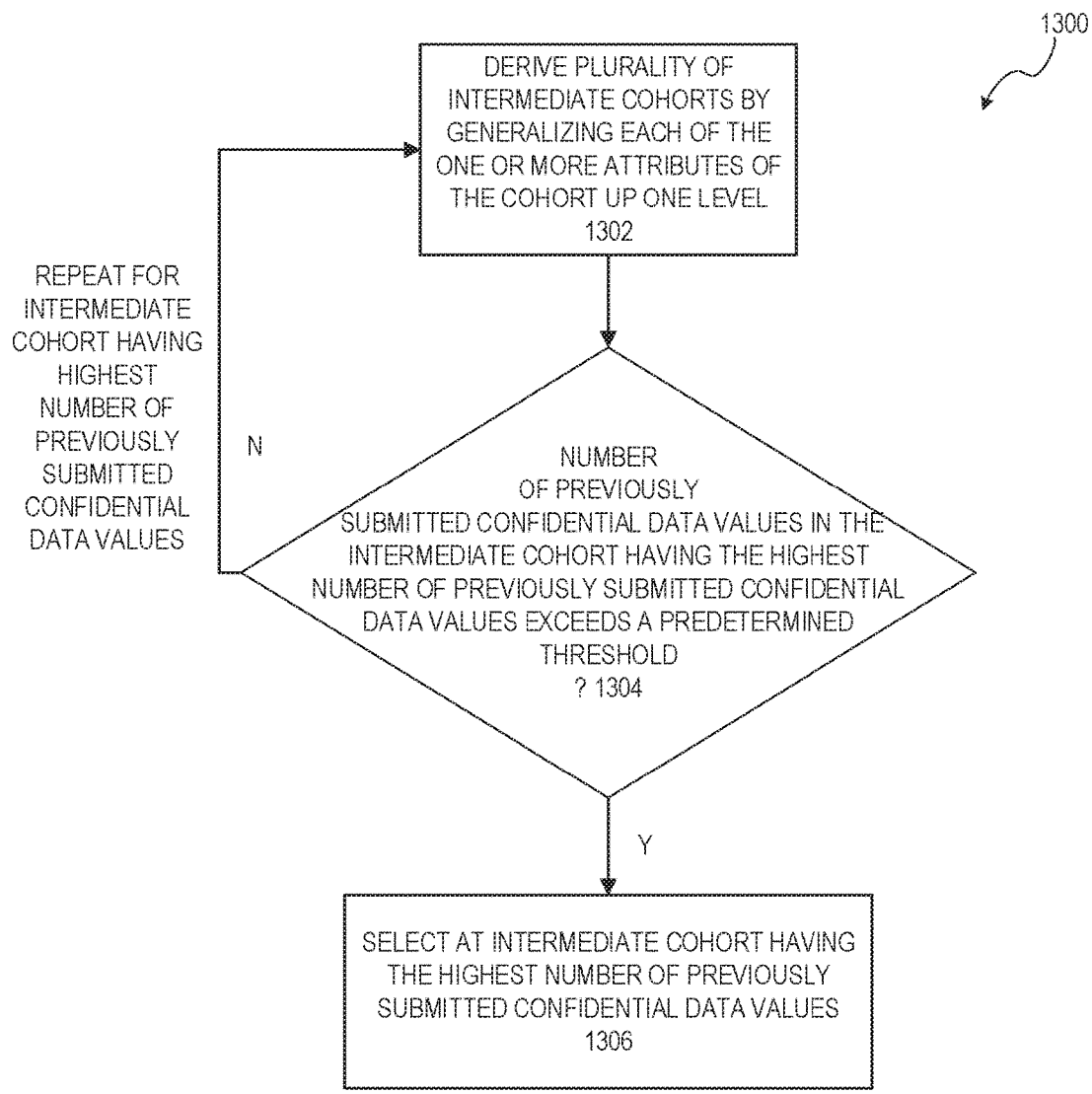
FIG. 13 is a flow diagram illustrating a method of deriving one or more intermediate cohorts, in accordance with a second example embodiment.

FIG. 13 is a flow diagram illustrating a method 1300 of deriving one or more intermediate cohorts at operation 1108, in accordance with a second example embodiment. At operation 1302, a plurality of intermediate cohorts are derived by generalizing each of the one or more attributes of the cohort up one level. At operation 1304, it is determined whether the number of previously submitted confidential data values in the intermediate cohort having the highest number of previously submitted confidential data values exceeds a predetermined threshold. If so, then at operation 1306 the intermediate cohort having the highest number of previously submitted confidential data values is selected. If not, then the method 1300 loops back to operation 1302 for the intermediate cohort having the highest number of previously submitted confidential data values.

Referring back to FIG. 11, at operation 1110, a parameterized distribution is fit to the previously submitted confidential data values that are contained within the selected one or more of the intermediate cohorts, outputting one or more estimated parameters for each of the selected one or more of the intermediate cohorts. At operation 1112, a lower limit for the first confidential data type is set based on the one or more estimated parameters for each of the selected one or more intermediate cohorts. In cases where there are multiple selected intermediate cohorts, this may include calculating a weighted average of lower limits calculated for each of the selected intermediate cohorts.

At operation 1114, an upper limit for the first confidential data type is set based on the one or more estimated parameters for each of the selected one or more intermediate cohorts. In cases where there are multiple selected intermediate cohorts, this may include calculating a weighted average of upper limits calculated for each of the selected intermediate cohorts.

At operation 1116, it is determined whether the confidential data value submitted by the first user is an outlier by determining if the confidential data value submitted by the first user is lower than the lower limit or higher than the upper limit. If so, then at operation 1118 the confidential data value submitted by the first user is prevented from being used for insights provided to other users.

Once outliers in the submitted data are removed or otherwise prevented from being included in insight calculations, the system may turn to actually performing the insight calculations used to determine what insights are to be gained from the submitted confidential data. In an example embodiment, for any given cohort, a confidence score may be computed for each confidential data type in the data points of the cohort. Thus, for example, if an insight is desired for compensation data for people with the title of "Software Product Manager" in San Jose, a first confidence score may be computed for base salaries, a second confidence score may be computed for bonuses, a third confidence score may be computed for stock compensation, and so on.

In an example embodiment, each of these confidence scores is calculated by multiplying a support score by a non-outlier score. The support score may be defined as:

support score=$n'/(n'+c)$, where c is a smoothing constant and n' is the number of non-outlier entries for that confidential data type.

The non-outlier score may be defined as:

non-outlier score=n'/n, where n is the total number of non-null entries for that confidential data type.

For example, assuming a c value of 20, if there are 15 entries for base salary in a given cohort, with 12 of them being non-outliers, the confidence score would be 12/32*12/15=0.3.

The confidence score may be utilized in insight calculations as described in more detail below.

Figure 14:
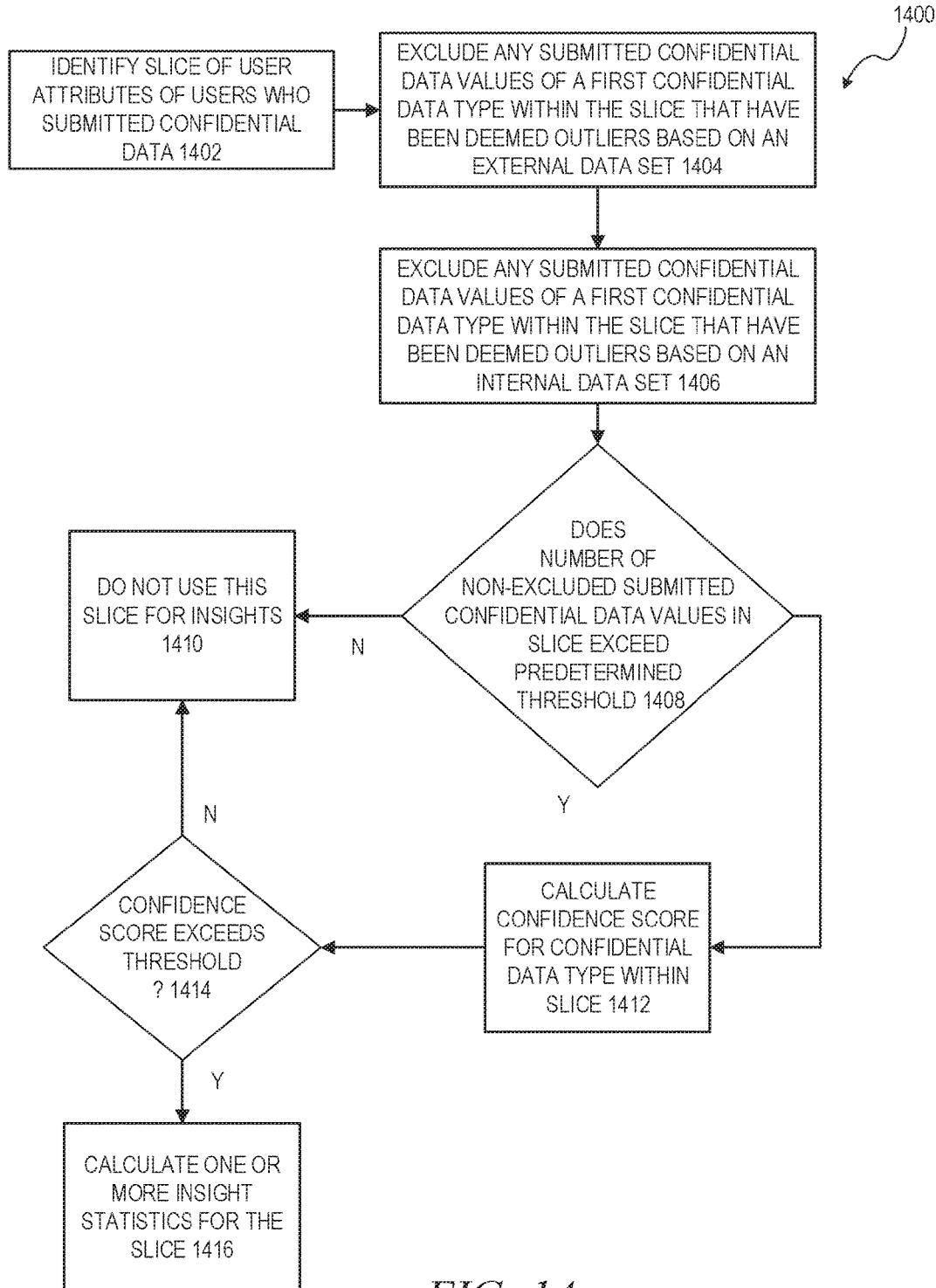
FIG. 14 is a flow diagram illustrating a method for handling submission of confidential data, in accordance with an example embodiment.

The above procedures may be combined to create a unified approach to providing insights based on confidential data submissions. FIG. 14 is a flow diagram illustrating a method 1400 for handling submission of confidential data in accordance with an example embodiment.

At operation 1402, a slice of user attributes of users who submitted confidential data is identified. This identification may, for example, be received explicitly by a user wishing to view insights on confidential data submitted by other users, or may alternatively be deduced implicitly by the system based, for example, on user attributes of the user who is attempting to view the insights. For example, if the user wishing to view the insights is a computer programmer in the San Francisco Bay Area, the slice selected may be computer programmers in the San Francisco Bay Area. More complex deductions may also be performed. For example, the system may know that people working in the San Francisco Bay Area often will be interested in confidential data submitted by users in other similarly sized cities. As such, the system may deduce that the user may wish to view insights for computer programmers in the San Francisco Bay Area or New York City. Alternatively, the system may deduce that the user wishes to view insights for computer programmers in all of California, or for people in the technology industry in San Francisco.

No matter how the slice is determined, once it is identified, then at operation 1404, one or more submitted confidential data values of a first confidential data type within the slice that have been deemed outliers based on an external data set are excluded from the slice. This may be based, for example, on the method described above with respect to FIG. 8. At operation 1406, one or more submitted confidential data values of the first confidential data type within the slice that have been deemed outliers based on an internal data set are excluded from the slice. This may be based, for example, on the methods described above with respect to FIGS. 9 and 11. At operation 1408, it is determined whether the number of submitted confidential data values, for a confidential data type, remaining in the slice (after the exclusions above) exceeds a predetermined threshold. If not, then at operation 1410, the information for the confidential data type in the slice is deemed unreliable and not used for insights. This improves functioning of the computer system by preventing costly calculations of confidence scores or insight statistics for confidential data types/slices that will not be reliable anyway. This predetermined threshold may vary based on the slice and slice attributes. For example, for slices including a region attribute, the predetermined threshold may be set lower than for slices not including a region attribute (for example, at the country level, or where no location is specified).

If so, however, then at operation 1412, a confidence score is calculated for the confidential data type within the slice. The confidence score may be calculated, as described above, as being equal to the support score multiplied by the non-outlier score. At operation 1414, it is determined whether the confidence score exceeds a threshold. If not, then the method 1400 moves to operation 1410, where the information for the confidential data type in the slice is deemed unreliable and not used for insights. This improves functioning of the computer system by preventing costly calculations of insight statistics for confidential data types/slices that will not be reliable anyway. If so, however, then one or more insight statistics for submitted confidential data values of the confidential data type for the slice (that have not been excluded) can be calculated and used to provide insights to users at operation 1416. These insight statistics may include, for example, median, average, standard deviation, percentiles, etc. The types of insight statistics calculated may also vary based on the number of non-excluded submitted confidential data values being considered. For example, if the number of non-excluded submitted confidential data values being considered is low, then perhaps average and median will be computed but not percentiles, whereas percentiles would also be calculated if the number of non-excluded submitted confidential data values being considered is high.

The method 1400 may be repeated for each confidential data type in the submitted confidential data. It should be noted that certain confidential data types may be considered reflective of the reliability of the overall tuple of confidential data types in which they were submitted. For example, if a tuple includes confidential data types of different types of compensation information (e.g., base salary, bonus, stock, tips, etc.), then the confidential data type of base salary may be reflective of the reliability of the overall tuple. As such, if the confidence score for base salary in a particular slice is low, the system may decide to exclude all confidential data types in the submitted confidential data for that slice, even if some of the other confidential data types, for example bonus, have confidence scores higher than the predetermined threshold.

Figure 15A:
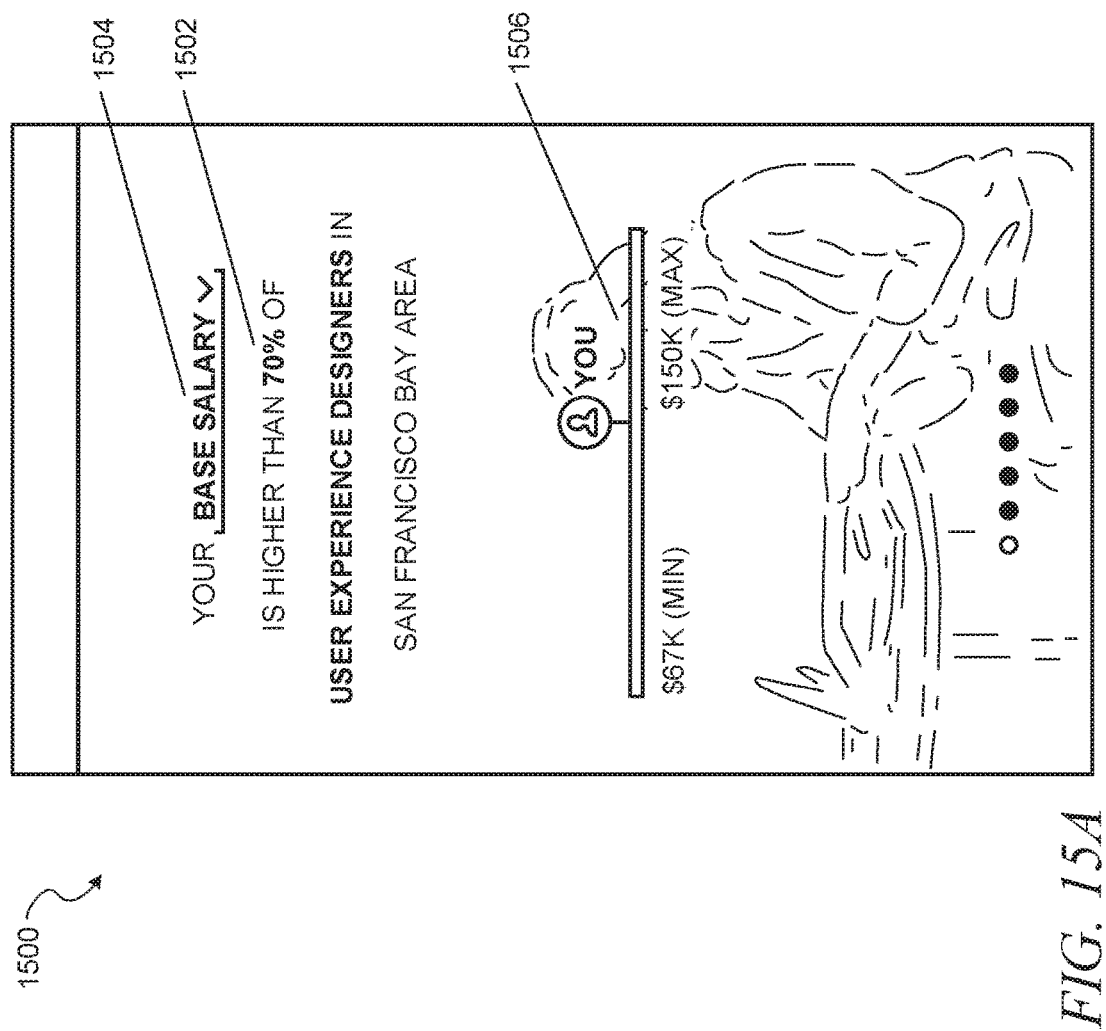
FIGS. 15A-15C are screen captures illustrating a user interface for displaying insights to a first user from confidential data submitted by other users, in accordance with an example embodiment.
Figure 15B:
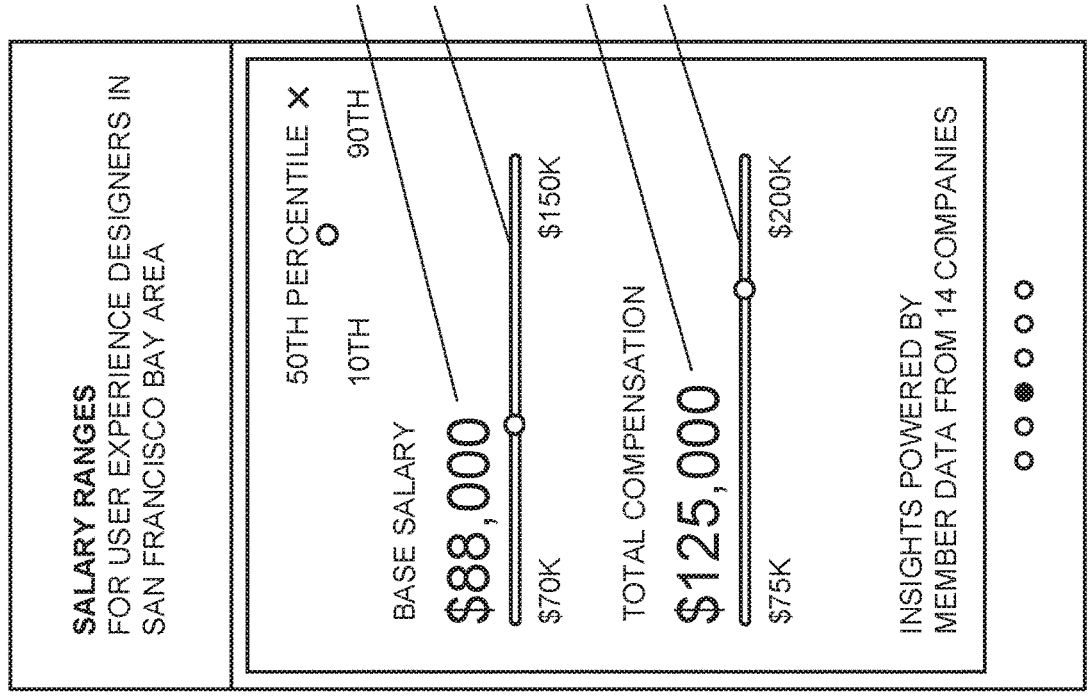
Figure 15C:
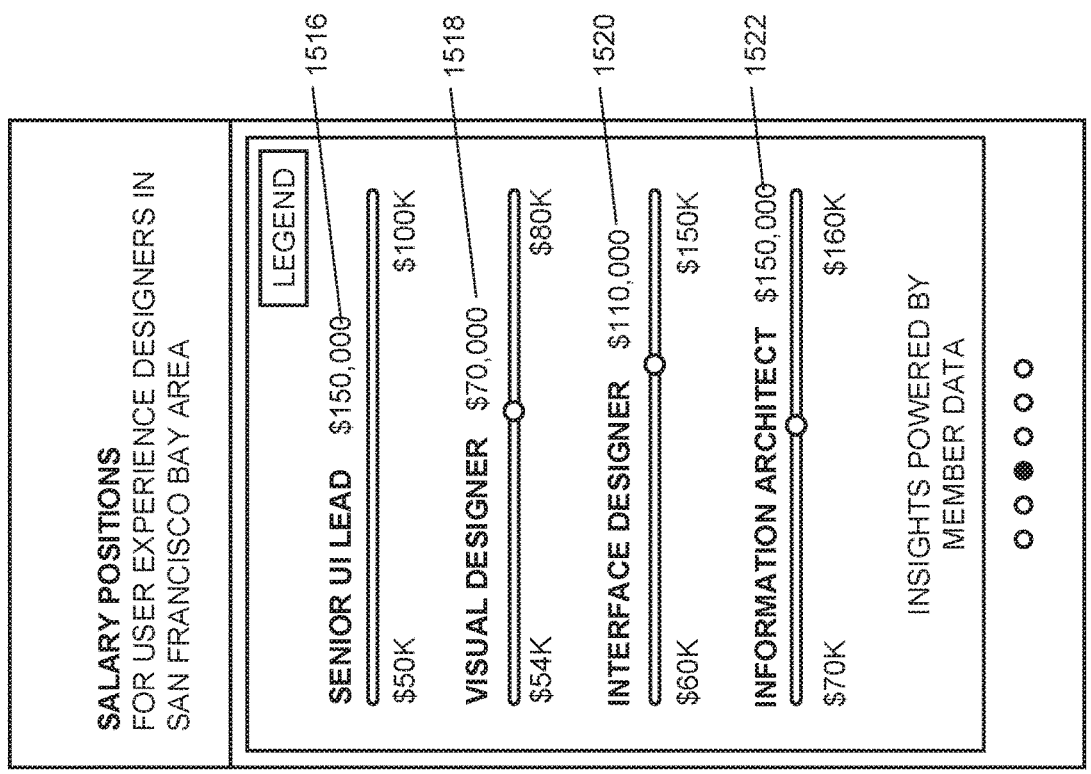

FIGS. 15A-15C are screen captures illustrating a user interface 1500 for displaying insights to a first user from confidential data submitted by other users, in accordance with an example embodiment. Referring first to FIG. 15A, the user interface 1500 displays a metric 1502 comparing confidential data of the first user to confidential data of other users in a same slice as the first user. Here, for example, the first user is able to see that his base salary (as selectable via a drop-down menu 1504) is higher than that of 70% of other users in the same slice (the slice being depicted as User Experience Designers in the San Francisco Bay Area). This metric is also displayed as a graphic 1506 for easy comparison.

Referring now to FIG. 15B, the user interface 1500 displays salary ranges for users in the same slice as the first user, including a median base salary 1508, a range of submitted base salaries 1510, median total compensation 1512, and a range of submitted total compensations 1514.

Referring now to FIG. 15C, the user interface 1500 displays insights 1516, 1518, 1520, and 1522 for positions related to the position of the first user. Notably, these insights 1516, 1518, 1520, and 1522 may require using information from slices other than the one the first user belongs to. In an example embodiment, there is no limitation on the confidential data frontend 104 retrieving insights from the confidential data insights data store 122 that come from slices different from ones to which the user being presented with the insights belongs, although in some example embodiments, the confidential data frontend 104 may itself wish to limit the first user's ability to ask for and/or view certain types of information (e.g., the confidential data frontend 104 may permit the first user to view salary information for positions related to the first user's own position, but not unrelated positions).

As depicted above, all of the insights may be statistical information derived from confidential data submitted by users other than the user viewing the insights (as well as potentially including the user's own confidential data as well).

Figure 16:
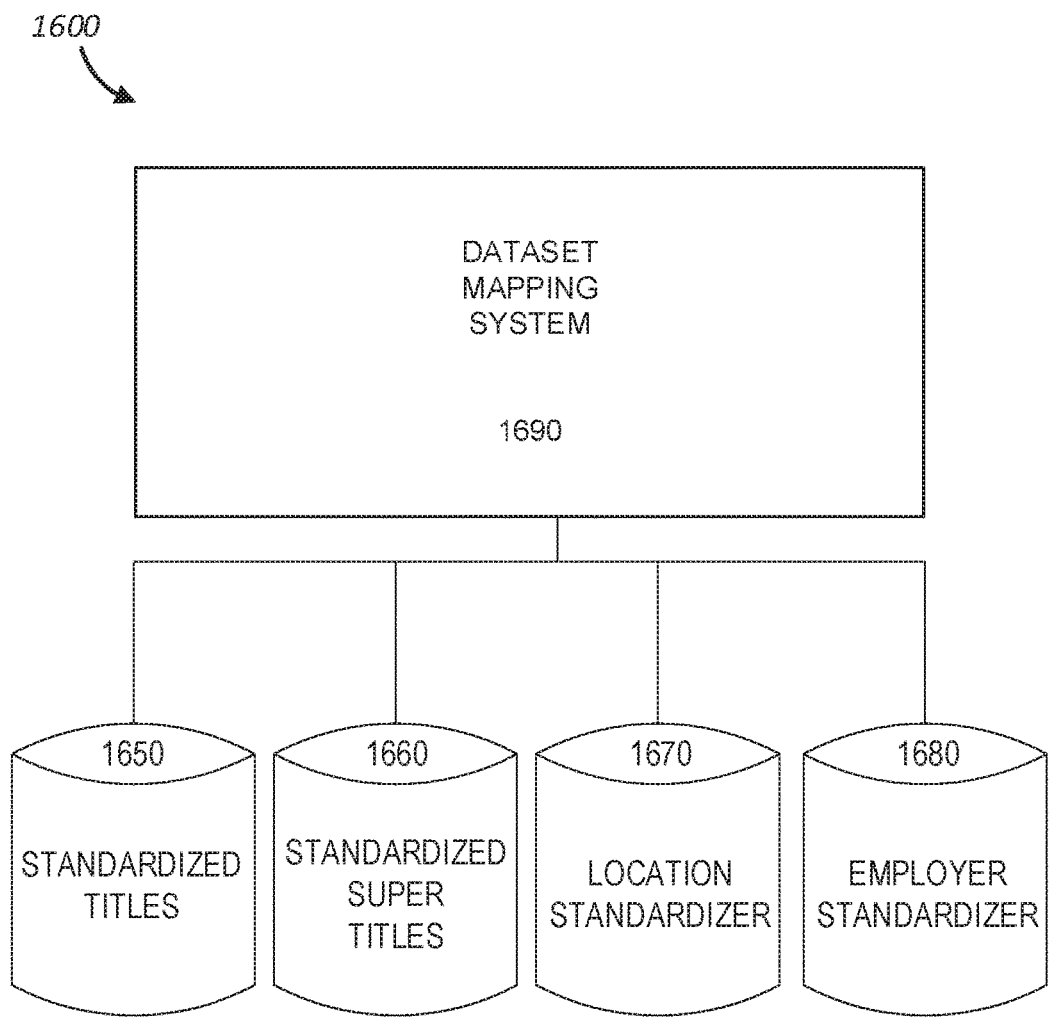
FIG. 16 is a block diagram illustrating a dataset mapping system according to one example embodiment.

FIG. 16 is a block diagram illustrating a dataset mapping system according to one example embodiment. According to one example embodiment, a data set mapping system obtains data from a remote database. In certain examples, the remote database is a public database and the data set mapping system electronically communicates with the public database via the Internet, or another network connection. In another example embodiment, the data set mapping system obtains the data using an API. In this example embodiment, the data set mapping system retrieves the data according to one or more rules defined by the API.

In one example embodiment, the data obtained from the remote database includes information about employees of a remote organization. In one example, the data represents public employees of a city. In other examples, the data represents employees of a corporation, school, or other public organization, or the like.

In certain examples, the data set mapping system trains a machine learning system on members of the private network to generate a cohort using the member's confidential data. According to one example embodiment, the final cohorts are used a predefined set of cohorts and the machine learning system learns how private members' confidential data maps to certain of the predefined cohorts. As will be further described, the data set mapping system is then applied to the remote data to map individuals included in the remote data to the same set of cohorts, and update private member's data according to the mapped individuals.

In one example embodiment, the data set mapping system standardizes entities to be used to input into the machine learning system. By standardizing entities used by the machine learning system, the data set mapping system avoids excessive string matching for company names, titles, regions, etc., as will be further explained.

In one example embodiment, a standardized entity is title. The data set mapping system 150 employs a pre-trained inferred title standardizer to generate a set of likely standard titles using a member's description of his/her title (e.g., a raw string). In another example embodiment, the resulting standard titles match one or more final cohort titles. In one example, a member's title is "Software Developer" and potential titles are "Programmer" "Computer Engineer," and "Software Engineer" (e.g., for a final cohort of "software engineers" with 0-3 years experience, located in Santa Clara County). In one example embodiment, the title standardizer generates three most likely standard titles. In certain examples, the inferred title standardizer employs edit distance, synonym matching, and term variations to generate a standard title from a raw title string.

In another example embodiment, the data set mapping system 1690 also employs a super title standardizer. In one example, the super title standardizer combines the standardized titles with a predefined set of super-titles to generate a standardized super-title. In one example, the super title standardizer prunes the standardized titles on the basis of a confidence score and number of results (e.g., a score of 0.25 and a maximum of three results) to generate the raw titles then gets super title identifiers from the set of standardized super-titles using the standardized titles and the generated raw titles.

As will be further described, the data set mapping system 1690 uses the standardized titles and the standardized super titles to reduce search space in matching external data to one or more cohorts.

In one example embodiment, the online social networking service uses a user interface allowing a member to select a standard title and/or a standard super title when registering for membership in the online social networking service. In another example embodiment, as the external organizational data include aspects of a member that is not included in previously requested membership information, the data set mapping system 1690 may adjust the user interface to include missing aspects. According to one non-limiting example, the data set mapping system 1690 receives a size of an entity's employer. In this example, the data set mapping system 1690 updates the user interface to request that a potential new member enter his/her employer's size. Of course, the data set mapping system 1690 may determine other aspects and this disclosure is not limited in this regard.

In another example embodiment, the data set mapping system 1690 employs a region standardizer to return a set of standard location identifiers based on a raw location string, a latitude/longitude pair, or other location information. In one example, the data set mapping system 1690 retrieves location information including "Murray, Utah," sends the location information to the region standardizer, which could return "Salt Lake City," "Utah," and "United States of America" (e.g., a standardized region according to a predetermined set of regions).

In one example embodiment, the region standardizer retrieves standardized locations from a remote database of locations. In one example, the remote data of locations includes a database of cities, states, counties, countries, or the like. In another example embodiment, the region standardizer determines a standardized location by selecting a closest region. For example, the region standardizer may retrieve GPS coordinates for a member, and look up the closest city to the GPS coordinates. In one example embodiment, data in the data record includes a statement that "I work for Santa Clara City." In response, the region standardizer determines that the entity represented by the data record is employed in Santa Clara.

In one example embodiment, the data set mapping system 1690 employs an employer standardizer that returns a set of employers (selected from a set of predetermined employers) based on a raw employer string associated with a specific entity. In one example, the employer standardizer returns the top 100 employers. In another example, the external data includes an entity describing "I work for Santa Clara City." In response, the employer standardizer includes "Santa Clara City" in the set of potential employers.

In another example embodiment, the data set mapping system 1690 uses the set of standardized titles, the set of standardized super titles, and the set of location identifiers to generate a data record for each unique set of titles, super titles, location identifies, and employers. The data set mapping system 1690 then employs a trained machine learning system to determine a highest scoring data record that includes the combination of title, super title, location, and employer, and maps the entity to one of the final cohorts represented by the data record.

In another example embodiment, each member of the online social networking service is asked, via a user interface, whether they desire participation in the mapping operations. In response to the member not desiring to participate, the data set mapping system 1690 does not map the member. In response to the member desiring to participate, the data set mapping system maps the member to a specific cohort, and maps external data to the cohort as well. In this way, the data set mapping system 1690 accentuates cohort parameters with additional data included in the external data.

In one example embodiment, the data set mapping system 1690 maps the member to a specific cohort in response to the score for the properties of the member most closely matched by the score for the cohort. For example, the machine learning system is applied to the member and the final cohorts. In this example embodiment, the data set mapping system 1690 generates the cohort for the member of the online social networking service and maps the member to the cohort.

In another example embodiment, additional data in the external data set is salary. In response to the data set mapping system 1690 mapping several data records (representing external entities) to a cohort, the data set mapping system updates a statistical salary for the members of the online social networking service that are also mapped to the cohort. In this way, external salary data for entities that match a cohort, affect salary data for the members of the online social networking service.

In one example embodiment, the external data records include an amount of experience (e.g., a number of years). In this example embodiment, the data set mapping system 1690 includes the amount of experience to generate the unique combinations of titles, super-titles, employers, etc.

Figure 17:
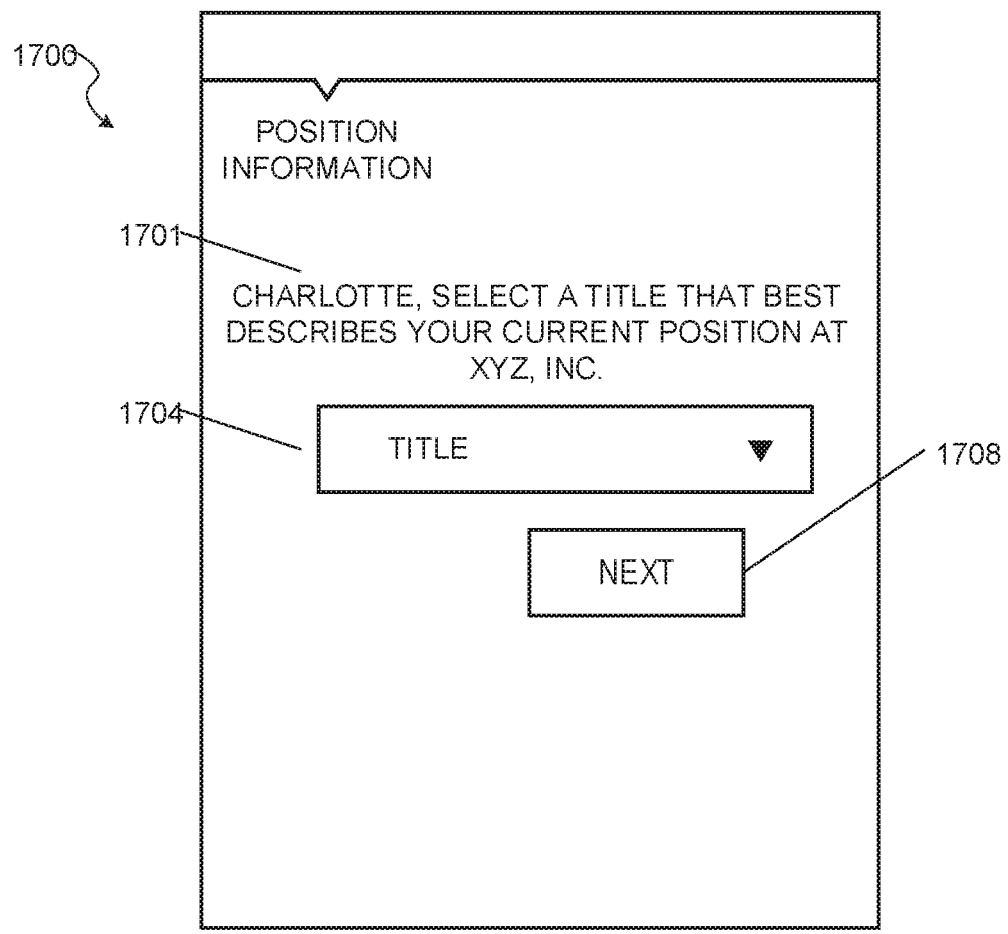
FIG. 17 an example of a user interface provided by a dataset mapping system, in accordance with an example embodiment.

FIG. 17 an example of a user interface 1700 provided by a dataset mapping system, in accordance with an example embodiment. In FIG. 17, the user is prompted (e.g., via a prompt 1701) to select a title 1704 from a predefined set of standard titles. The user of also offered a "Next" button 1708 selectable by the user after selecting a title. The information contained in the prompt 1701 may be retrieved from the user's profile. In another example embodiment, the dataset mapping system determines a title parsed from a description of the user's current employment position.

In one example embodiment, the user interface 1700 also requests that the user select a location, employer, experience level, or other properties related to title. Furthermore, in another example embodiment, the data set mapping system 1690 updates the user interface 1700 in response to receiving other fields or aspects from external organizational data. In one example, remote organizational data includes titles of immediate supervisors, and in response, the data set mapping system 1690 updates the user interface 1700 to requests that the user also select a title for their immediate supervisor. The data set mapping system 1690 may add the additional field below the title 1704, or above or the like.

Figure 18:
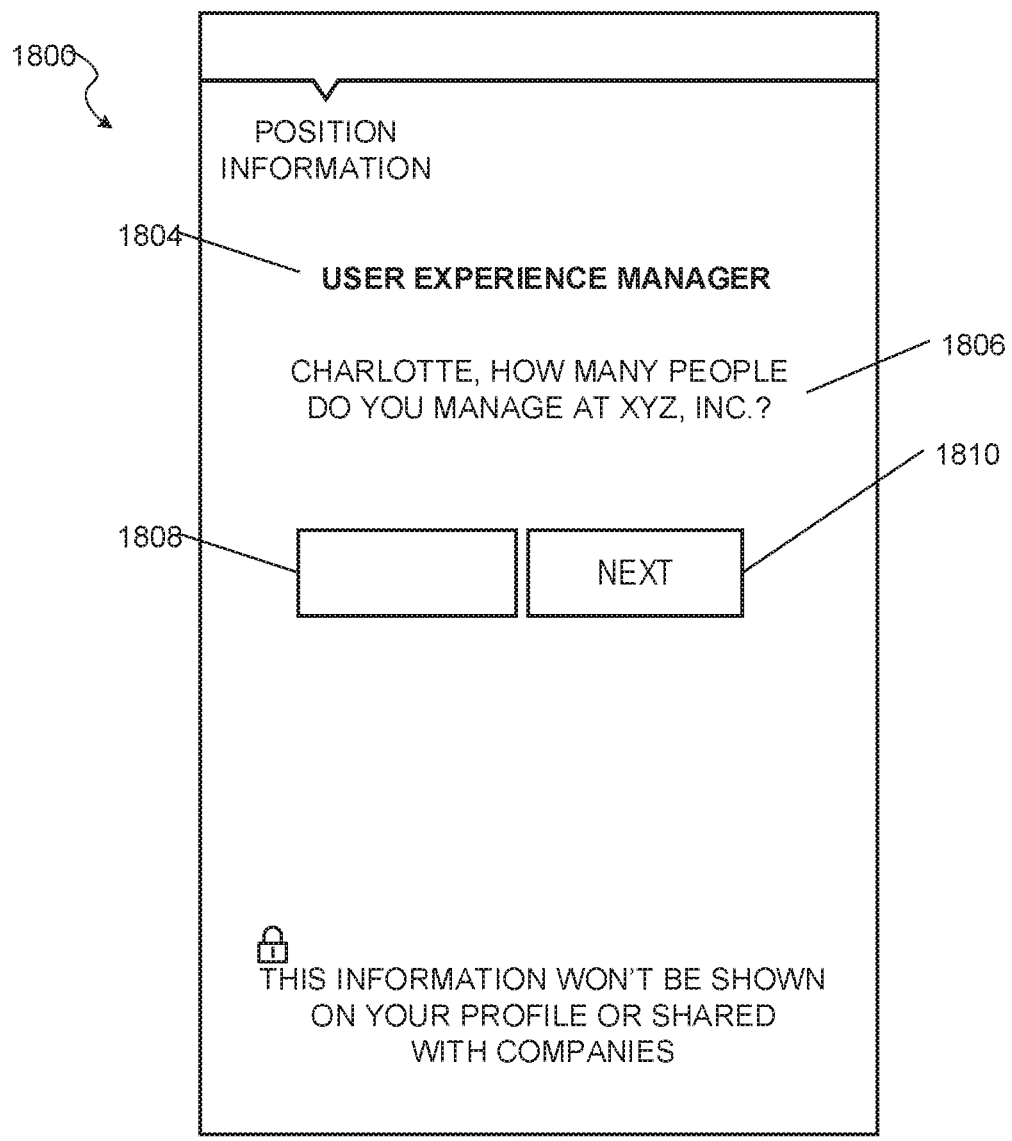
FIG. 18 is another example of a user interface provided by a dataset mapping system, in accordance with another example embodiment.

FIG. 18 is an example of a user interface 1800 provided by a dataset mapping system 1690, in accordance with an example embodiment. In FIG. 18, the user interface 1800 displays a title 1804 selected by the user (e.g., using user interface 1700) and the user is prompted (e.g., via a prompt 1806) to indicate how many people are being managed. The user interface 1800 includes a field 1808 to receive the number of people, and a "next" button 1810 to indicate completion of input for this user interface 1810.

Figure 19:
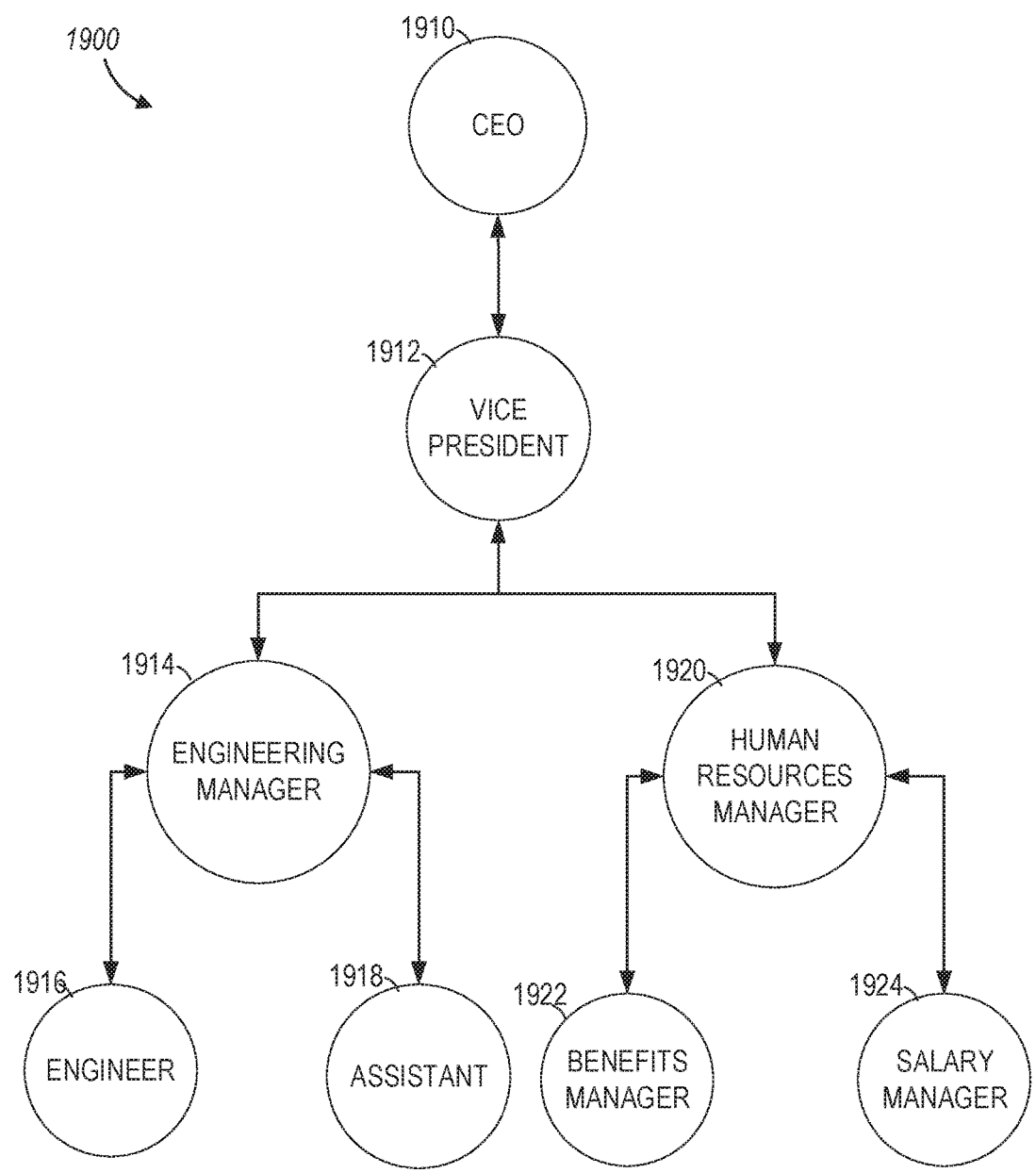
FIG. 19 is a block diagram illustrating one example of a cohort organizational chart, in accordance with one example embodiment.

FIG. 19 is a block diagram illustrating one example of a cohort organizational chart 1900, in accordance with one example embodiment. According to one example embodiment, a system generates an organizational chart that includes several cohorts. In one example embodiment, the cohorts are limited to a specific region. In one example, the region is a city, state, county, country, or the like.

In another example embodiment, the cohorts are limited to a specific organizational size. In one example, the cohorts are limited to corporations with less than 50 people, but of course, any value may be used and this disclosure is not limited in this regard. In other embodiments, the cohorts are for a specific industry and a specific size.

According to FIG. 19, a set of cohorts represents an organizational chart 1900. A first cohort 1910 includes CEO's for an engineering corporation. The CEO cohort 1910 is connected to a vice president cohort 1912. The vice president cohort 1912 is connected to both an engineering manager cohort 1914 and a human resources manager cohort 1920.

In this example embodiment, the engineering manager cohort 1914 is connected to an engineer cohort 1916 and an assistant cohort 1918. The human resources manager cohort 1920 is connected to a benefits manager cohort 1922 and a salary manager cohort 1924.

In one example embodiment, the data set mapping system 1690 applies a trained machine learning system to data records in an external data set and matches the external data record to one of the final cohorts. In another example embodiment, the data set mapping system 1690 applies the trained machine learning system to members of the online social networking service to one of the final cohorts. In this way, information from external organizational data is used to update cohort information and subsequently infers information for members that are mapped to the cohort. For example, where the data set mapping system 1690 maps external data records including salary to the cohort, the data set mapping system 1690 may infer a member's salary that is mapped to that cohort.

In one example embodiment, a method begins and the data set mapping system obtains organizational data from a remote database. In another example, the data set mapping system 1690 employs an electronic interface and obtains the organizational data using an API. In one example embodiment, the organizational data includes data records for a plurality of employed entities. The data records may include a wide variety of properties for the entities. In one example embodiment, the data records include title, location and employer for the entity. In other examples, the data records include salary, supervisor's titles, a number of managed persons, or other properties.

The method continues and the data set mapping system 1690 determines a set of standardized titles using the title in the data record. In one example embodiment, the standardized titles are selected from a set of predefined titles. In one example, a set of predefined titles are stored in a database and the data set mapping system selects a threshold number of title matching the title in the data record as previously described.

The method continues and the data set mapping system 1690 determines a set of standardized super-titles using the title in the data record. In one example embodiment, the standardized titles are selected from a set of predefined super-titles. In one example, a set of predefined super-titles are stored in a database and the data set mapping system selects a threshold number of super-titles most closely matching the title in the data record as previously described.

The method continues and the data set mapping system 1690 determines a set of locations using the location in the data record. In one example embodiment, the standardized locations are selected from a set of predefined locations. In one example, a set of predefined locations are stored in a database and the data set mapping system selects a threshold number of title matching the title in the data record as previously described.

The method continues and the data set mapping system 1690 determines a set of standardized employers using the employer in the data record. In one example embodiment, the standardized employers are selected from a set of predefined employers. In one example, a set of predefined titles are stored in a database and the data set mapping system selects a threshold number of employers most closely matching the title in the data record as previously described. As previously described, the set of standard employers may be selected based on string matching, character operator difference, or other string comparison techniques.

The method continues and the data set mapping system 1690 applies a trained machine learning system to score each unique combination of the standardized titles, standardized super-titles, standardized locations, and standardized employers.

The method continues and the data set mapping system 1690 selects a final cohort using a highest scoring unique combination. The method continues and the data set mapping system 1690 updates profile information for a member of the online social networking service that are mapped to the cohort using additional data in the data record.

In another example embodiment, the method includes training the machine learning system to generate a cohort for a member of the online social networking service according to the member's titles, locations, and employers.

In one example embodiment, additional data is a salary, the data set mapping system 1690 maps several entities represented by the data records to the cohort, and updates a statistical salary for the members of the online social networking service that are mapped to the cohort by combining the salaries for the mapped data records.

In one example embodiment, a bias calculation system is configured to compute a set of bias metrics for each cohort and aggregate the computed biases across all cohorts. The bias calculation system then aggregates the following bias metrics for each cohort: relative deviation in median base salary, relative deviation in the range for the base salary.

For the aggregate relative deviation in median base salary, the bias calculation system first determines a relative deviation in median base salary for each specific cohort by taking the absolute value of the difference between a true median and an experimental median, and dividing the result of the absolute value by the true median as follows:

$$RDMBS=abs((\text{true median})-(\text{experimental median}))/(\text{true median})$$

In one example embodiment, the true median is calculated using the mapped data and the experimental median is calculated using a ground truth data set having verified values (e.g., no bias is present). The bias calculation system then calculates the aggregate relative deviation in median base salary by summing (for all cohorts) the size of the cohort (given by the variable 'i') multiplied by a beta value for the size of the cohort (Beta(c(i))), and dividing the results of that sum by a sum of all the sizes of the corresponding cohorts (SOCC) that belong to the ground truth data set. An equation is given as follows for each cohort:

$$(i*\text{Beta}(c(i)))/(SOCC)$$

In another example embodiment, the bias calculation system calculates an Aggregate Relative Deviation in the Range for the Base Salary (or other data set) by receiving a defined range from an administrator of the bias calculation system. In one example, the defined range is 10% to 90% representing the $10^{th}$ percentile and the $90^{th}$ percentile of the data in the data set. A range for the base salary for a specific cohort is calculated by subtracting the salary value at the low end of the defined range (e.g., 10%) by the salary value at the high end of the defined range (e.g., 90%). The range for the base salary for each cohort is the salary value at the low end subtracted from the salary value at the high end.

In another example embodiment, the range for the base salary is determined according to the confidence interval for the median of the base salary as previously calculated.

The bias calculation system also computes a relative deviation in the range for the base salary according to the following equation:

$$c(i)=\text{Abs}(\text{True Range}-\text{Experimental Range})/\text{True Range}$$

The bias calculation system computes an Aggregate Relative Deviation in the Range for the Base Salary according to the following equation:

$$\text{sum for all cohorts}(\text{size of }i*\text{Gamma}(c(i)))/\text{sum for all cohorts}(\text{size of }i)$$

In this equation, "size of i" denotes the number of users in cohort i in the ground truth dataset.

The bias calculation system, in one example embodiment, computes both the Aggregate Relative Deviation in Median Base Salary and the Aggregate Relative Deviation in the Range for the Base Salary for members of the online social networking service and compares the results of those values with the same calculations for all users of the mapped data set.

To compute sample bias, the bias calculation system computes the Aggregate Relative Deviation in Median Base Salary and the Aggregate Relative Deviation in the Range for the Base Salary for members of the online social networking service and compares those results with the same calculations for members of the mapped data set. The difference between the results of these separate groups of users indicates a sample bias mapped data set.

To compute selection bias, the bias calculation system computes the Aggregate Relative Deviation in Median Base Salary and the Aggregate Relative Deviation in the Range for the Base Salary for members of the online social networking service and compares those results with the same calculations for members of the online social networking service that were targeted by email or other data collection mechanisms. The difference between the results of these separate groups of users indicates a selection bias in responses from those members who were targeted.

To compute non-response bias, the bias calculation system computes the Aggregate Relative Deviation in Median Base Salary and the Aggregate Relative Deviation in the Range for the Base Salary for members of the online social networking service that were targeted by a communication requested salary data and compares those results with the same calculations for members of the online social networking service that responded to the targeted communications. The difference between the results of these separate groups of users indicates a non-response bias in data from responses from those members who responded to the targeted communication.

To compute a numerical value representing truthfulness, the bias calculation system computes the Aggregate Relative Deviation in Median Base Salary and the Aggregate Relative Deviation in the Range for the Base Salary for data received from members of the online social networking service that responded to a targeted communication and compares those results with accurate data stored at the online social networking service. The difference between the results received from the members and the data stored at the online social networking service represents a truthfulness metric for the data set.

In certain embodiments, the bias calculation system calculates selection bias, non-response bias, and truthfulness for a cohort and flags the cohort for display in response to the respective biases being below a threshold value. For example, and administrator for the bias calculation system may specify a threshold value as 20%. Of course, any other threshold value may be used and this disclosure is not limited in this regard.

In this example embodiment, in response to any of the calculated biases being above 20% (e.g., there is more than a 20% difference between the groups in the cohort), the bias calculation system prevents display of data representing the cohort.

For example, a web based server may be configured to provide access to the data representing the cohorts, however, in response to one of the cohorts not meeting one of the bias thresholds, the web server does not allow access to the cohort. In other examples, the bias calculation system flags different cohorts according to their associated bias threshold value.

In another example embodiment, the bias calculation system allows presentation of cohorts who meet the bias threshold values for each of selection bias, non-response bias, and truthfulness. In one embodiment, the bias calculation system calculates a quality score using the bias calculations. In one example, the quality score is a summation of the bias values. Of course, one skilled in the art may recognize may other ways in which the various biases can be mathematically combined and this disclosure is meant to include all such ways.

In one example embodiment, the bias calculation system provides programmatic access to the results of the calculations for the Aggregate Relative Deviation in the Range for the Base Salary the Aggregate Relative Deviation in Median Base Salary and the Aggregate Relative Deviation in the Range for the Base Salary allowing an administrator to plot, graph, or otherwise cause to be displayed. In this way, an administrator for the bias calculations system accesses the results of the calculations to determine whether adjust future targeted communications.

In one example, a particular targeted communication resulted in significant bias while another targeted communication yielded little bias. By presenting the results of these targeted communications and allowing programmatic access to the results, the bias calculation system allows an administrator to identify which aspects of the targeted communications yielded bias values above a threshold amount and which did not.

Figure 20:
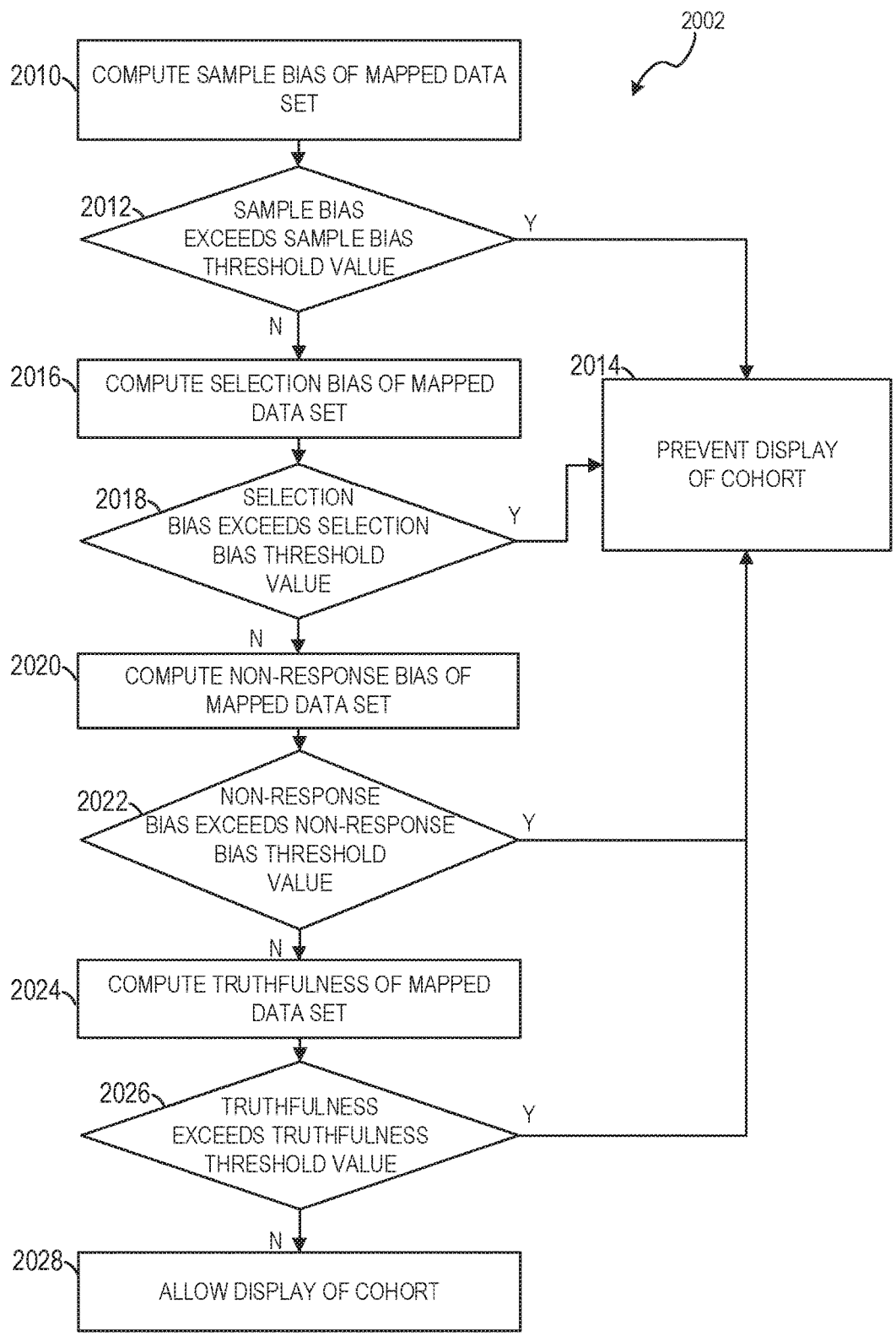
FIG. 20 is a flow diagram illustrating a method of determining bias in a mapped dataset, in accordance with an example embodiment.

FIG. 20 is a flow diagram illustrating a method 2000 of determining bias in a mapped dataset, in accordance with an example embodiment. Operations in the method 2000 are performed by the bias calculation system.

In one example embodiment, the method 2000 begins and at operation 2010, the bias calculation system computes sample bias of a mapped data set. The method continues at operation 2012 and the bias calculation system determines whether the sample bias exceeds a sample bias threshold received from an administrator of the bias calculation system.

In response to the computed sample bias exceeding the sample bias threshold value, the method 2000 continues at operation 2014. In response to the computed sample bias not exceeding the sample bias threshold value, the method 2000 continues at operation 2016.

At operation 2014, the bias calculation system prevents display of mapped data associated with the cohort. At operation 2016, the bias calculation system calculates a selection bias for the mapped data set. The method 2000 continues at operation 2018 and the bias calculation system determines whether the selection bias exceeds a selection bias threshold. In one example, the selection bias threshold is received from an administrator of the bias calculation system, however, this is not necessarily the case as the bias calculation system may receive or retrieve a bias threshold value in many different want as one skilled in the art may appreciate.

The method 2000 continues at operation 2020 and the bias calculation system calculate a non-response bias for a specific cohort in the mapped data set. The method 2000 continues at operation 2022 and the bias calculation system determines whether the non-response bias for the cohort exceeds a non-response bias threshold value.

In response to the computed non-response bias exceeding the non-response bias threshold value, the method 2000 continues at operation 2014. In response to the computed non-response bias not exceeding the sample bias threshold value, the method 2000 continues at operation 2024.

At operation 2024, the bias calculation system determines a truthfulness value for a mapped data set representing a cohort. The method 2000 continues at operation 2026 and the bias calculation system determines whether the truthfulness value for the mapped data set exceeds a truthfulness threshold value. In one example, the truthfulness threshold value is 10%. In response to the truthfulness value for the mapped data set exceeding the truthfulness threshold value, the method 2000 continues at operation 2014. In response to the truthfulness value for the mapped data set not exceeding the truthfulness threshold value, the method 2000 continues at operation 2028 where the bias calculation system allows presentation of the mapped data set representing the cohort.

Figure 21:
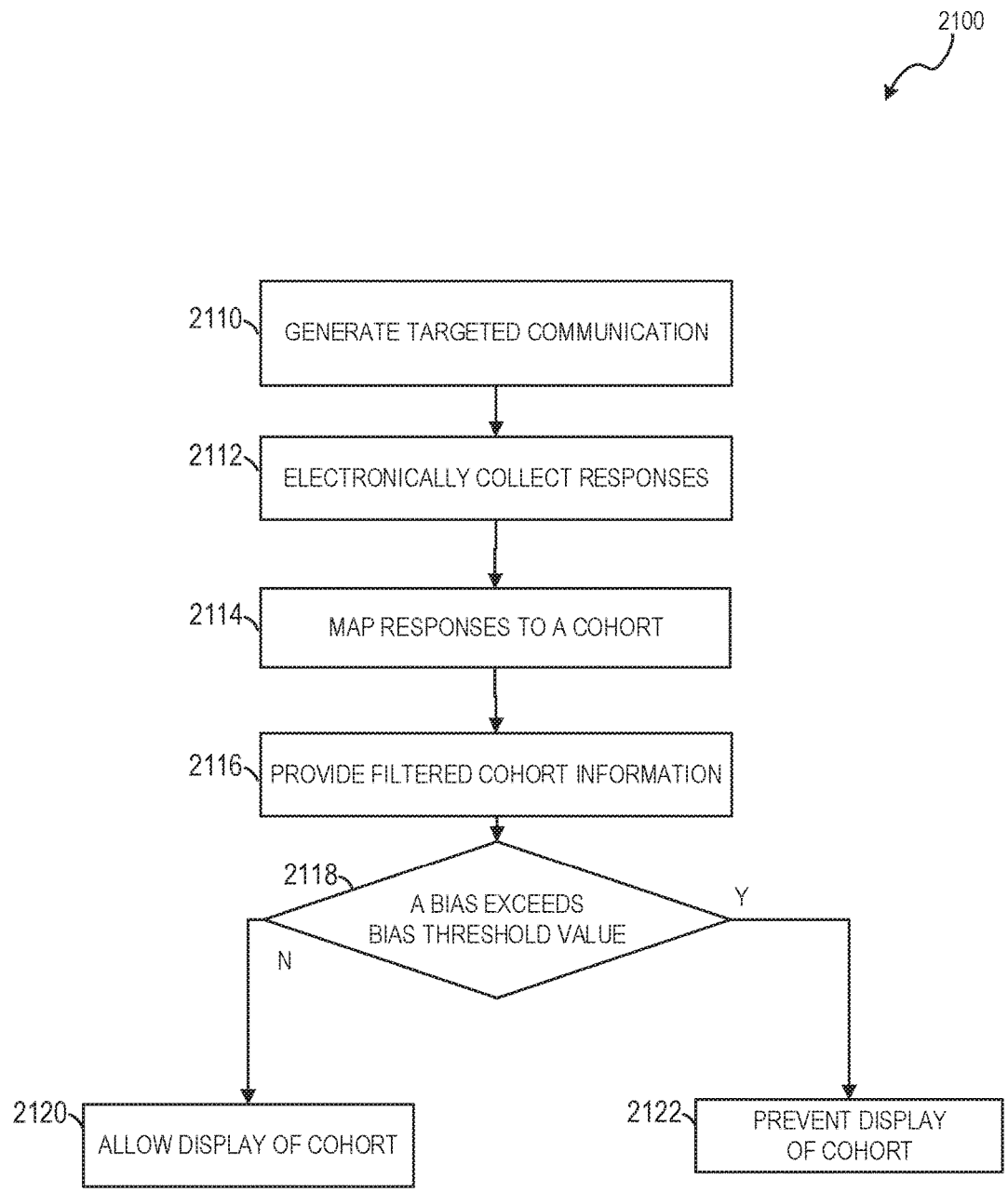
FIG. 21 is a flow diagram illustrating a method of filtering a mapped dataset, in accordance with an example embodiment.

FIG. 21 is another flow diagram illustrating a method 2100 of determining bias in a mapped dataset, in accordance with an example embodiment. Operations in the method 2000 are performed by the bias calculation system.

In one example embodiment of the method 2100, the bias calculation system begins at operation 2110 and generates a targeted communication to respective computing devices of one or more members of an online social networking service. In one example embodiment, the bias calculation system queries a remote database using a network interface to retrieve a set of members and generates and transmits an electronic message to each member using the online social networking service.

The method 2100 continues at operation 2112 and the bias calculation system electronically collecting the responses to the targeted communication, the responses including a value indicating a salary for the member that responded. In one example, targeted members respond with an email and the bias calculation system parses the email to collect the responses.

The method 2100 continues at operation 2114 and the bias calculation system maps the responses to a cohort by updating a record in a database of members, the record identifying the cohort for the respective member. In one example embodiment, the bias calculation system matches an employment title and a city of a member to an employment title and city of a cohort.

The method 2100 continues at operation 2116 and the bias calculation system filters information corresponding to a cohort to provide filtered cohort information indicating one or more of a sample bias for the cohort, a selection bias for the cohort, a non-response bias for the cohort, a truthfulness bias for the cohort. In one example embodiment, the bias calculation system calculates the various biases as described herein.

The method 2100 continues at operation 2118 and bias calculation system determines whether filtered data for the cohort transgresses a bias threshold value for the cohort. In certain example embodiments, each bias has an associated bias threshold value and the bias calculation system compares each bias value with their respective bias threshold value.

In response to any of the filtered bias values exceeding their respective bias threshold values, the method 2100 continues at operation 2122 and the bias calculation system suppresses displaying of information corresponding to the cohort. In response to none of the filtered bias values exceeding their respective bias threshold values, the method 2100 continues at operation 2120 and the bias calculation system allows the display of cohort filtered data. In one example embodiment, a member's desires to see filtered cohort data and the bias calculation system either suppresses or displays the filtered cohort data as described herein. For example, the member may interface with the bias calculation system using a client device by requesting a web page that would display the filtered cohort data.

Modules, Components, and Logic

In one example embodiment, additional data is a salary, the data set mapping system 1690 maps several entities represented by the data records to the cohort, and updates a statistical salary for the members of the online social networking service that are mapped to the cohort by combining the salaries for the mapped data records.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-20 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 22:
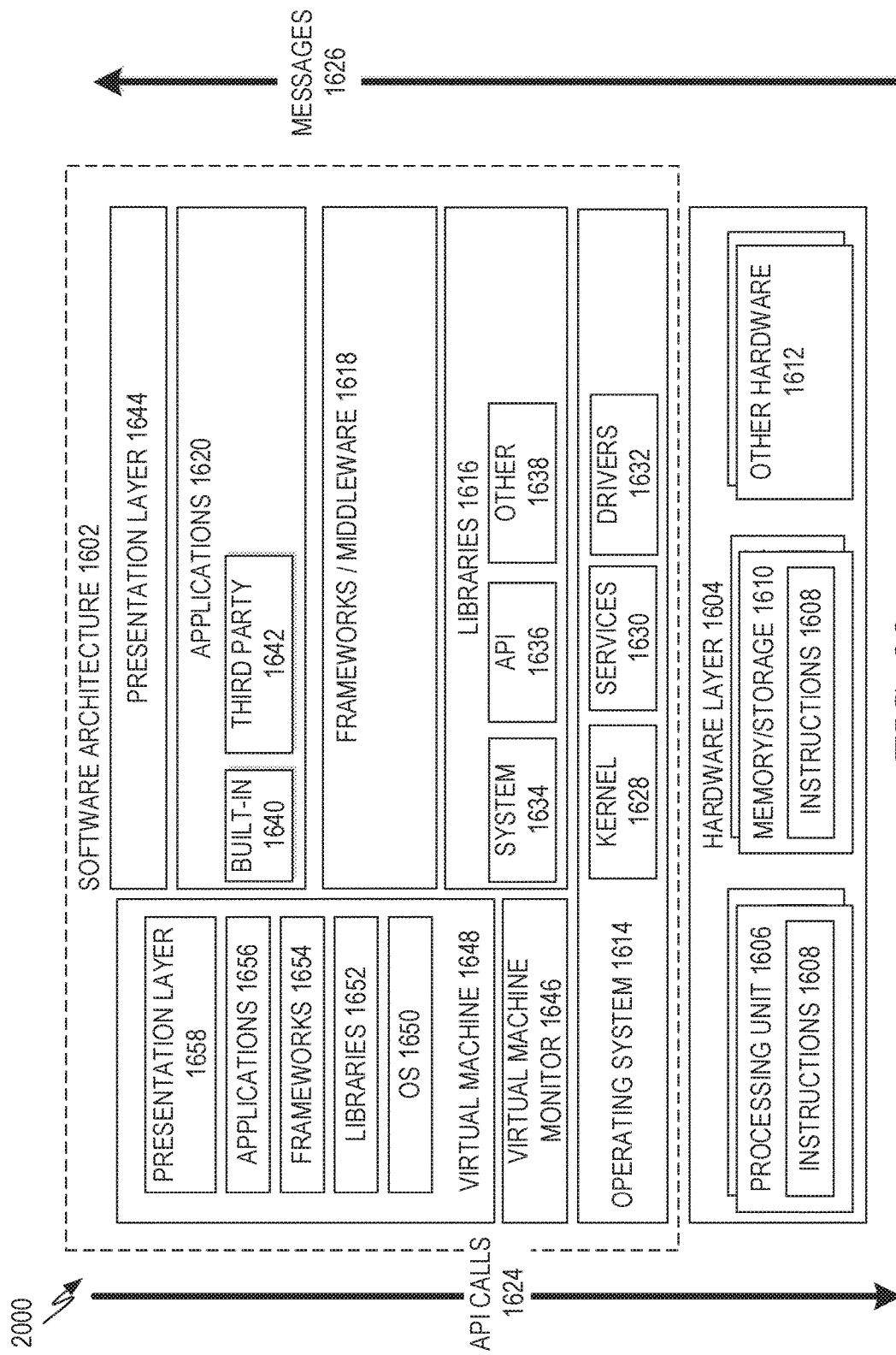
FIG. 22 is a block diagram illustrating a representative software architecture, which may be used in conjunction with various hardware architectures herein described.

FIG. 22 is a block diagram 2000 illustrating a representative software architecture 1602, which may be used in conjunction with various hardware architectures herein described. FIG. 20 is merely a non-limiting example of a software architecture, and it will be appreciated that many other architectures may be implemented to facilitate the functionality described herein. The software architecture 1602 may be executing on hardware such as a machine 1709 of FIG. 17 that includes, among other things, processors 1710, memory/storage 1730, and I/O components 1750. A representative hardware layer 1604 is illustrated and can represent, for example, the machine 1709 of FIG. 17. The representative hardware layer 1604 comprises one or more processing units 1606 having associated executable instructions 1608. The executable instructions 1608 represent the executable instructions of the software architecture 1602, including implementation of the methods, modules, and so forth of FIGS. 1-15C. The hardware layer 1604 also includes memory and/or storage modules 1610, which also have the executable instructions 1608. The hardware layer 1604 may also comprise other hardware 1612, which represents any other hardware of the hardware layer 1604, such as the other hardware illustrated as part of the machine 1709.

In the example architecture of FIG. 16, the software architecture 1602 may be conceptualized as a stack of layers where each layer provides particular functionality. For example, the software architecture 1602 may include layers such as an operating system 1614, libraries 1616, frameworks/middleware 1618, applications 1620, and a presentation layer 1644. Operationally, the applications 1620 and/or other components within the layers may invoke API calls 1624 through the software stack and receive responses, returned values, and so forth, illustrated as messages 1626, in response to the API calls 1624. The layers illustrated are representative in nature and not all software architectures have all layers. For example, some mobile or special-purpose operating systems may not provide a layer of frameworks/middleware 1618, while others may provide such a layer. Other software architectures may include additional or different layers.

The operating system 1614 may manage hardware resources and provide common services. The operating system 1614 may include, for example, a kernel 1628, services 1630, and drivers 1632. The kernel 1628 may act as an abstraction layer between the hardware and the other software layers. For example, the kernel 1628 may be responsible for memory management, processor management (e.g., scheduling), component management, networking, security settings, and so on. The services 1630 may provide other common services for the other software layers. The drivers 1632 may be responsible for controlling or interfacing with the underlying hardware. For instance, the drivers 1632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1616 may provide a common infrastructure that may be utilized by the applications 1620 and/or other components and/or layers. The libraries 1616 typically provide functionality that allows other software modules to perform tasks in an easier fashion than by interfacing directly with the underlying operating system 1614 functionality (e.g., kernel 1628, services 1630, and/or drivers 1632). The libraries 1616 may include system libraries 1634 (e.g., C standard library) that may provide functions such as memory allocation functions, string manipulation functions, mathematical functions, and the like. In addition, the libraries 1616 may include API libraries 1636 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1616 may also include a wide variety of other libraries 1638 to provide many other APIs to the applications 1620 and other software components/modules.

The frameworks 1618 (also sometimes referred to as middleware) may provide a higher-level common infrastructure that may be utilized by the applications 1620 and/or other software components/modules. For example, the frameworks 1618 may provide various graphic user interface (GUI) functions, high-level resource management, high-level location services, and so forth. The frameworks 1618 may provide a broad spectrum of other APIs that may be utilized by the applications 1620 and/or other software components/modules, some of which may be specific to a particular operating system or platform.

The applications 1620 include built-in applications 1640 and/or third-party applications 1642. Examples of representative built-in applications 1640 may include, but are not limited to, a contacts application, a browser application, a book reader application, a location application, a media application, a messaging application, and/or a game application. The third-party applications 1642 may include any of the built-in applications 1640 as well as a broad assortment of other applications. In a specific example, the third-party application 1642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1642 may invoke the API calls 1624 provided by the mobile operating system such as the operating system 1614 to facilitate functionality described herein.

The applications 1620 may utilize built-in operating system 1614 functions (e.g., kernel 1628, services 1630, and/or drivers 1632), libraries 1616 (e.g., system libraries 1634, API libraries 1636, and other libraries 1638), and frameworks/middleware 1618 to create user interfaces to interact with users of the system. Alternatively, or additionally, in some systems, interactions with a user may occur through a presentation layer, such as the presentation layer 1644. In these systems, the application/module "logic" can be separated from the aspects of the application/module that interact with a user.

Figure 23:
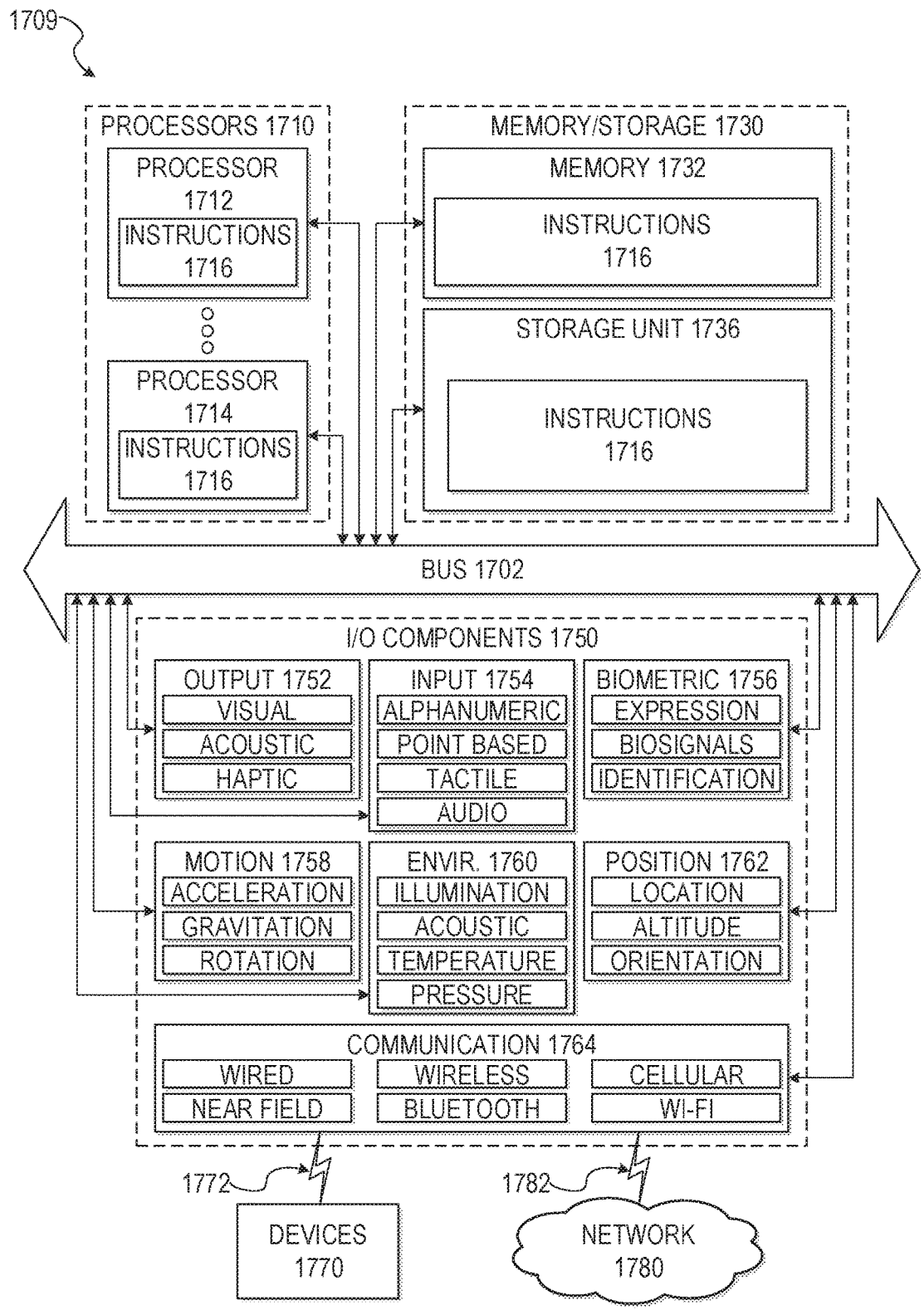
FIG. 23 is a block diagram illustrating components of a machine, according to some example embodiments, able to read instructions from a machine-readable medium (e.g., a machine-readable storage medium) and perform any one or more of the methodologies discussed herein.

Some software architectures utilize virtual machines. In the example of FIG. 16, this is illustrated by a virtual machine 1648. A virtual machine creates a software environment where applications/modules can execute as if they were executing on a hardware machine (such as the machine 1709 of FIG. 17, for example). A virtual machine is hosted by a host operating system (e.g., operating system 1614 in FIG. 16) and typically, although not always, has a virtual machine monitor 1646, which manages the operation of the virtual machine 1648 as well as the interface with the host operating system (e.g., operating system 1614). A software architecture executes within the virtual machine 1648, such as an operating system 1650, libraries 1652, frameworks/middleware 1654, applications 1656, and/or a presentation layer 1658. These layers of software architecture executing within the virtual machine 1648 can be the same as corresponding layers previously described or may be different.
Example Machine Architecture and Machine-Readable Medium FIG. 23 is a block diagram illustrating components of a machine 1709, according to some example embodiments, able to read instructions from a machine-readable medium (e.g., a machine-readable storage medium) and perform any one or more of the methodologies discussed herein. Specifically, FIG. 17 shows a diagrammatic representation of the machine 1709 in the example form of a computer system, within which instructions 1716 (e.g., software, a program, an application, an applet, an app, or other executable code) for causing the machine 1709 to perform any one or more of the methodologies discussed herein may be executed. The instructions transform the general, non-programmed machine into a particular machine programmed to carry out the described and illustrated functions in the manner described. In alternative embodiments, the machine 1709 operates as a standalone device or may be coupled (e.g., networked) to other machines. In a networked deployment, the machine 1709 may operate in the capacity of a server machine or a client machine in a server-client network environment, or as a peer machine in a peer-to-peer (or distributed) network environment. The machine 1709 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1709. Further, while only a single machine 1709 is illustrated, the term "machine" shall also be taken to include a collection of machines 1700 that individually or jointly execute the instructions 1716 to perform any one or more of the methodologies discussed herein.

The machine 1709 may include processors 1710, memory/storage 1730, and I/O components 1750, which may be configured to communicate with each other such as via a bus 1702. In an example embodiment, the processors 1710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1712 and a processor 1714 that may execute the instructions 1716. The term "processor" is intended to include multi-core processors that may comprise two or more independent processors (sometimes referred to as "cores") that may execute the instructions 1716 contemporaneously. Although FIG. 17 shows multiple processors 1710, the machine 1709 may include a single processor with a single core, a single processor with multiple cores (e.g., a multi-core processor), multiple processors with a single core, multiple processors with multiples cores, or any combination thereof.

The memory/storage 1730 may include a memory 1732, such as a main memory, or other memory storage, and a storage unit 1736, both accessible to the processors 1710 such as via the bus 1702. The storage unit 1736 and memory 1732 store the instructions 1716 embodying any one or more of the methodologies or functions described herein. The instructions 1716 may also reside, completely or partially, within the memory 1732, within the storage unit 1736, within at least one of the processors 1710 (e.g., within the processor's cache memory), or any suitable combination thereof, during execution thereof by the machine 1709. Accordingly, the memory 1732, the storage unit 1736, and the memory of the processors 1710 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1716. The term "machine-readable medium" shall also be taken to include any medium, or combination of multiple media, that is capable of storing instructions (e.g., instructions 1716) for execution by a machine (e.g., machine 1709), such that the instructions, when executed by one or more processors of the machine (e.g., processors 1710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1750 may include a wide variety of components to receive input, provide output, produce output, transmit information, exchange information, capture measurements, and so on. The specific I/O components 1750 that are included in a particular machine will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 may include output components 1752 and input components 1754. The output components 1752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environmental components 1760, or position components 1762, among a wide array of other components. For example, the biometric components 1756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 may include acceleration sensor components (e.g., accelerometer), gravitation sensor components, rotation sensor components (e.g., gyroscope), and so forth. The environmental components 1760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1709 to a network 1780 or devices 1770 via a coupling 1782 and a coupling 1772, respectively. For example, the communication components 1764 may include a network interface component or other suitable device to interface with the network 1780. In further examples, the communication components 1764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., a peripheral device coupled via a USB).

Moreover, the communication components 1764 may detect identifiers or include components operable to detect identifiers. For example, the communication components 1764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1764, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network and the coupling 1782 may be a Code Division Multiple Access (CDMA) connection, a Global System for Mobile communications (GSM) connection, or another type of cellular or wireless coupling. In this example, the coupling 1782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, the instructions 1716 may be transmitted or received using a transmission medium via the coupling 1772 (e.g., a peer-to-peer coupling) to the devices 1770. The term "transmission medium" shall be taken to include any intangible medium that is capable of storing, encoding, or carrying the instructions 1716 for execution by the machine 1709, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a non-transitory computer-readable medium having instructions stored thereon, which, when executed by a processor, cause the system to:
generate a targeted communication to respective computing devices of one or more members of an online social networking service;
electronically collect the responses to the targeted communication, the responses including a value indicating a salary for the member that responded;
map the responses to a cohort by updating a record in a database of members, the record identifying the cohort for the respective member;
filter information corresponding to a cohort to provide filtered cohort information indicating one or more of a sample bias for the cohort, a selection bias for the cohort, a non-response bias for the cohort, a truthfulness bias for the cohort;
suppress displaying of information corresponding to the cohort in response to the filtered information for the cohort indicating one or more of the biases being above a bias threshold value.

2. The system of claim 1, wherein the instructions further cause the system to display information corresponding to the cohort in response to the filtered information for the cohort indicating one or more of the biases not being above a bias threshold value.

3. The system of claim 1, wherein the instructions further cause the processor to provide an interface allowing an administrator to set one or more of a selection bias threshold value, a sample bias threshold value, a non-response bias threshold value, and a truthfulness threshold value.

4. The system of claim 1, wherein the instructions further cause the system to map a member of the online social networking service to the cohort according to the member's titles, location, and employer.

5. The system of claim 1, wherein the instructions further cause the system to display a generic chart in response to one or more of the biases being above the bias threshold value.

6. The system of claim 5, wherein the generic chart is limited to publicly available data.

7. The system of claim 1, wherein the instructions further cause the system to aggregate bias across all cohorts, and flagging a set of data in response to the aggregated bias exceeding an aggregated bias threshold value.

8. A computerized method comprising:
generating a targeted communication to respective computing devices of one or more members of an online social networking service;
electronically collecting the responses to the targeted communication, the responses including a value indicating a salary for the member that responded;
mapping the responses to a cohort by updating a record in a database of members, the record identifying the cohort for the respective member;
filtering information corresponding to a cohort to provide filtered cohort information indicating one or more of a sample bias for the cohort, a selection bias for the cohort, a non-response bias for the cohort, a truthfulness bias for the cohort;
suppressing displaying of information corresponding to the cohort in response to the filtered information for the cohort indicating one or more of the biases being above a bias threshold value.

9. The method of claim 8, further comprising:
displaying information corresponding to the cohort in response to the filtered information for the cohort indicating one or more of the biases not being above the bias threshold value.

10. The method of claim 8, further comprising providing an interface allowing an administrator to set one or more of a selection bias threshold value, a sample bias threshold value, a non-response bias threshold value, and a truthfulness threshold value.

11. The method of claim 8, further comprising mapping a member of the online social networking service to the cohort according to the member's titles, location, and employer.

12. The method of claim 8, further comprising displaying a generic chart in response to one or more of the biases being above a bias threshold value.

13. The method of claim 12, wherein the generic chart is limited to publicly available data.

14. The method of claim 8, further comprising aggregating bias across all cohorts, and flagging a set of data in response to the aggregated bias exceeding an aggregated bias threshold value.

15. A non-transitory machine-readable storage medium comprising instructions, which when implemented by one or more machines, cause the one or more machines to perform operations comprising:
generating a targeted communication to respective computing devices of one or more members of an online social networking service;
electronically collecting the responses to the targeted communication, the responses including a value indicating a salary for the member that responded;
mapping the responses to a cohort by updating a record in a database of members, the record identifying the cohort for the respective member;
filtering information corresponding to a cohort to provide filtered cohort information indicating one or more of a sample bias for the cohort, a selection bias for the cohort, a non-response bias for the cohort, a truthfulness bias for the cohort;
suppressing displaying of information corresponding to the cohort in response to the filtered information for the cohort indicating one or more of the biases being above a bias threshold value.

16. The non-transitory machine-readable storage medium of claim 15, wherein the instructions further cause the system to:
display information corresponding to the cohort in response to the filtered information for the cohort indicating one or more of the biases not being above the bias threshold value,
the sample bias being above a sample bias threshold,
the selection bias being above a selection bias threshold,
the non-response bias being above a non-response bias threshold, and
the truthfulness value being above a truthfulness threshold value.

17. The non-transitory machine-readable storage medium of claim 15, wherein the instructions further cause the system to map a member of the online social networking service to the cohort according to the member's titles, location, and employer.

18. The non-transitory machine-readable storage medium of claim 15, wherein the instructions further cause the system to display a generic chart in response to one or more of the biases being above a bias threshold value.

19. The non-transitory machine-readable storage medium of claim 18, wherein the generic chart is limited to publicly available data.

20. The non-transitory machine-readable storage medium of claim 15, wherein the instructions further cause the system to aggregate bias across all cohorts, and flagging a set of data in response to the aggregated bias exceeding an aggregated bias threshold value.

* * * * *